(12) United States Patent
Yamamoto et al.

(10) Patent No.: US 7,432,857 B2
(45) Date of Patent: Oct. 7, 2008

(54) ADAPTIVE ANTENNA APPARATUS PROVIDED WITH A PLURALITY OF PAIRS OF BIDIRECTIONAL ANTENNAS

(75) Inventors: Atsushi Yamamoto, Osaka (JP); Koichi Ogawa, Hirakata (JP); Hirotaka Ishihara, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 798 days.

(21) Appl. No.: 10/981,624

(22) Filed: Nov. 5, 2004

(65) Prior Publication Data

US 2005/0136857 A1    Jun. 23, 2005

(30) Foreign Application Priority Data

Nov. 7, 2003    (JP)    ............................. P2003-378259

(51) Int. Cl.
*H01Q 3/02* (2006.01)
*H01Q 1/38* (2006.01)
*G01S 3/28* (2006.01)
*H04B 1/06* (2006.01)

(52) U.S. Cl. ................. 342/374; 342/383; 343/700 MS; 455/277.2

(58) Field of Classification Search ................ 342/374, 342/383; 343/700 MS; 455/277.2
See application file for complete search history.

(56) References Cited

U.S. PATENT DOCUMENTS

| | | | |
|---|---|---|---|
| 4,193,077 A | 3/1980 | Greenberg et al. | |
| 4,334,230 A | 6/1982 | Kane | |
| 5,410,321 A * | 4/1995 | Gordon et al. | ............... 342/374 |
| 5,434,575 A * | 7/1995 | Jelinek et al. | ............... 342/365 |
| 6,058,318 A * | 5/2000 | Kobayakawa et al. | .... 455/562.1 |
| 6,243,427 B1 * | 6/2001 | Stockton et al. | ............. 375/308 |
| 6,295,035 B1 * | 9/2001 | Holzheimer | ............. 343/792.5 |
| 6,356,242 B1 * | 3/2002 | Ploussios | ..................... 343/795 |
| 6,600,455 B2 | 7/2003 | Yamamoto et al. | |
| 6,622,013 B1 * | 9/2003 | Miyoshi et al. | .......... 455/277.2 |
| 6,674,966 B1 * | 1/2004 | Koonen | ........................ 398/70 |
| 6,792,033 B1 * | 9/2004 | Maruta et al. | ................ 375/148 |
| 7,139,324 B1 * | 11/2006 | Ylitalo et al. | ................ 375/267 |
| 2001/0044276 A1 * | 11/2001 | Ihara et al. | ..................... 455/63 |
| 2002/0001337 A1 * | 1/2002 | Chauncey et al. | ............. 375/132 |
| 2002/0032001 A1 * | 3/2002 | Fischer et al. | .............. 455/3.01 |
| 2002/0068613 A1 * | 6/2002 | Miyano et al. | .............. 455/562 |
| 2003/0156061 A1 * | 8/2003 | Ohira | .......................... 342/372 |
| 2004/0057410 A1 * | 3/2004 | Kaipianen et al. | ........... 370/338 |
| 2004/0196834 A1 * | 10/2004 | Ofek et al. | ................... 370/352 |

FOREIGN PATENT DOCUMENTS

| | | |
|---|---|---|
| JP | 8-8797 | 1/1996 |
| JP | 10-242739 | 9/1998 |

* cited by examiner

*Primary Examiner*—Harry Liu
(74) *Attorney, Agent, or Firm*—Wenderoth, Lind & Ponack, L.L.P.

(57) ABSTRACT

An adaptive antenna apparatus is provided with a total of four or more, even number N of antennas including a plurality of pairs of antennas each having a bidirectional characteristic. The N antennas are provided respectively at vertexes of a polygon of the same number as the number N of the antennas, so that each pair of antennas of the plurality of pairs of antennas opposes to each other. An adaptive control circuit takes an adaptive control over radio signals using one pair of antennas opposing to each other among the N antennas. In the adaptive antenna apparatus, the each pair of antennas is provided to oppose to each other so that axes of directions of main beams of the directional characteristics of the each pair of antennas substantially coincide with each other.

6 Claims, 31 Drawing Sheets

FIRST PREFERRED EMBODIMENT

SECOND PREFERRED EMBODIMENT

THIRD PREFERRED EMBODIMENT

FOURTH PREFERRED EMBODIMENT

FIFTH PREFERRED EMBODIMENT

SIXTH PREFERRED EMBODIMENT

SEVENTH PREFERRED EMBODIMENT

EIGHTH PREFERRED EMBODIMENT

NINTH PREFERRED EMBODIMENT

TENTH PREFERRED EMBODIMENT

ELEVENTH PREFERRED EMBODIMENT

ADAPTIVE ANTENNA APPARATUS PROVIDED WITH A PLURALITY OF PAIRS OF BIDIRECTIONAL ANTENNAS

BACKGROUND OF THE INVENTION

1. Field of the Invention

The present invention relates to an adaptive antenna apparatus for use in a base station or a mobile station of, for example, a mobile communication system. In particular, the present invention relates to an adaptive antenna apparatus, which includes a plurality of pairs of antennas each having a bidirectional characteristic, and which includes a total of four or more, even number of antennas, and which takes an adaptive control on radio signals using a pair of antennas opposing to each other.

2. Description of the Related Art

FIG. 32 is a perspective view showing a configuration of a prior art adaptive antenna apparatus disclosed in the Japanese Patent Laid-Open Publication No. 10-242739. The adaptive antenna apparatus shown in FIG. 32 is constituted so that three omni-directional antennas are arranged in parallel to each other on a predetermined horizontal surface. In the adaptive antenna apparatus, the number of antennas can be reduced by setting an interval S between the adjacent omni-directional antennas to be equal to or larger than one wavelength and to be equal to or smaller than three wavelengths.

Referring to FIG. 33, two omni-directional antennas 101a and 101b are arranged in parallel to each other so as to be separated from each other by a predetermined interval S between the antennas. The omni-directional antenna 101a has a circular radiation pattern 102a, and the omni-directional antenna 101b has a circular radiation pattern 102b. It is assumed that the interval S between the antennas is half the wavelength.

FIG. 34 is a graph showing a suppressed amount of an interference wave under the adaptive control when an incident angle of a desired wave and an incident angle of an interference wave are set in the case of FIG. 33. The suppressed amount of the interference wave corresponds to an electric energy that indicates how the interference wave is suppressed under the adaptive control relative to an incidence electric energy of the interference wave under no adaptive control. It is assumed herein that the desired wave and the interference wave are equal in amplitude to each other, and that a noise having 0.001 times the amplitude of the desired wave is inputted to the adaptive antenna apparatus. In addition, the omni-directional antenna 101a is located on the Z-axis on which the X-axis intersects the Y-axis, and that the incident angle is defined as an angle from +X-axis toward +Y-axis as shown in FIG. 33. In FIG. 34, the incident angles of the desired wave and the interference waves are shown up to ±45 degrees.

As is apparent from FIG. 34, it is difficult to suppress the interference wave when a difference between the incident angle of the desired wave and that of the interference wave is equal to or smaller than five degrees. When the incident angle difference between the desired wave and the interference wave is equal to or smaller than five degrees, an effect of suppressing the interference wave is relatively small. Accordingly, this angle difference range becomes out of a control range of the adaptive antenna apparatus. However, in the other ranges, it is shown that the suppressed amount of the interference wave is relatively high, i.e., 10 dB or more.

Next, a phase shift amount of a phase shifter required for an interference wave suppression operation executed by the adaptive antenna apparatus will be examined. By way of example, the results of changing the incident angle of the interference wave when the incident angle of the desired wave is zero degree are shown in FIG. 35. A horizontal axis of FIG. 35 indicates an angle difference between the incident angle of the interference wave and that of the desired wave. A vertical axis of FIG. 35 indicates a phase difference between a phase of a weight coefficient required for the omni-directional antenna 101b and a phase of a weight coefficient required for the omni-directional antenna 101a. In this example, the angle difference between the incident angle of the interference wave and that of the desired wave up to 180 degrees is set taking into consideration the symmetry of the adaptive antenna apparatus. As can be seen from FIG. 35, the maximum phase difference in weight coefficients between the antennas 101a and 101b was 360 degrees. In other words, in order to realize this phase shift amount, it is necessary to employ a phase shifter that has a phase shift amount of 360 degrees.

Further, in the case of no interference wave, it is necessary to realize a directional characteristic having a higher gain in a desired direction. When the desired wave arrives from, for example, the +X direction, the radio signal is controlled so that the maximum radiation gain can be obtained in the +X direction. The radiation patterns as obtained at that time are shown in FIG. 36. The phase difference between the antennas 101a and 101b was 180 degrees. As is apparent from FIG. 36, a relatively large gain of 4.4 dBi can be obtained in the +X-axial direction.

By changing the interval S between the antennas from one wavelength to three wavelengths in addition to the control operation executed by the adaptive antenna apparatus, a side lobe is generated in a radiation characteristic so that one beam can be made shaper. This can realize a deep drop of the directional characteristic between the main lobe and the side lobe, and realize an excellent interference wave suppression effect by the adaptive antenna apparatus using fewer antennas than usual. As described above, it is possible to realize the adaptive antenna apparatus capable of obtaining a high gain in an arrival direction of the desired wave with no interference wave, and capable of exhibiting the interference wave suppression effect with an interference wave by a simple structure.

However, the adaptive antenna apparatus shown in FIG. 32 has the following disadvantages. As already described, when the interference wave is present, it is necessary that the phase difference between the weight coefficients of signals inputted to the respective antennas is as large as 360 degrees so as to cover all directions on the horizontal surface. An ordinary phase shifter including a 90-degree hybrid circuit and a variable amplifier can in principle obtain a phase shift of only up to 90 degrees. Further, it is noted that a commercially available phase shifter using a diode has a phase shift amount of about 100 degrees. Accordingly, in order to realize the phase shift amount of 360 degrees, it is necessary to connect these phase shifters at multiple stages. This makes the circuit scale of the adaptive antenna apparatus larger, and this leads to making it difficult to reduce the size of the adaptive antenna apparatus. Moreover, as shown in FIG. 32, it is necessary to provide amplitude adjusters and phase shifters for adjusting amplitudes and phases as many as the antennas. Since the phase difference and the amplitude difference between the antennas are necessary for the control by the adaptive antenna apparatus, the number of amplitude adjusters and phase shifters can be reduced by one from the number of antennas. However, with the configuration of the prior art adaptive antenna apparatus, the number of shifters that can be reduced is limited up to one. In addition, as shown in FIG. 36, in the case of no interference wave, a radio wave is radiated similarly in a −X-axial direction opposite to the X-axial direction that is the direction of the desired wave. Further, since the interval S between the antennas is changed from one wavelength to three wavelengths, the size of the adaptive antenna apparatus cannot be reduced. Accordingly, it should be said that the structure of the prior art adaptive antenna apparatus which has a limit to a gain improvement due to such a wasteful use of radiation power is inappropriate.

SUMMARY OF THE INVENTION

It is an object of the present invention to provide an adaptive antenna apparatus capable of solving the conventional disadvantages, effectively and surely taking an adaptive control over radio signals to thereby obtain the main beam gain higher than the prior art adaptive antenna apparatus with a simpler structure than that of the prior art adaptive antenna apparatus, and obtaining a larger suppressed amount of an interference wave than that of the prior art adaptive antenna apparatus.

In order to achieve the aforementioned objective, according to one aspect of the present invention, there is provided an adaptive antenna apparatus includes a total of four or more, even number N of antennas including a plurality of pairs of antennas each having a bidirectional characteristic. The N antennas are provided respectively at vertexes of a polygon of the same number as the number N of the antennas, so that each pair of antennas of the plurality of pairs of antennas opposes to each other. The adaptive antenna apparatus further includes an adaptive control circuit which takes an adaptive control over radio signals using one pair of antennas opposing to each other among the N antennas.

In the above-mentioned adaptive antenna apparatus, the each pair of antennas is preferably provided to oppose to each other so that axes of directions of main beams of the directional characteristics of the each pair of antennas substantially coincide with each other.

In the above-mentioned adaptive antenna apparatus, the polygon is preferably an equilateral polygon.

In the above-mentioned adaptive antenna apparatus, the N antennas preferably have the same shape as each other.

In the above-mentioned adaptive antenna apparatus, an interval between the each pair of antennas is preferably an interval obtained by adding an integer multiple of half the wavelength to a quarter of the wavelength.

In the above-mentioned adaptive antenna apparatus, the adaptive control circuit preferably includes two changing devices, a switch device, a combining device, and a controller device. The two changing devices change at least one of an amplitude and a phase of each of the radio signal, and the switch device connects each one pair of antennas opposing to each other among the N antennas to the two changing devices, respectively. The combining device combines the radio signals outputted from the two changing devices, and outputs a combined radio signal. Further, the controller device selects one of the radio signals according to a predetermined judgment criterion from the radio signals received by the respective antennas by controlling the switch device based on the combined radio signal outputted from the combining device. When employing the one pair of antennas opposing to each other and including the antenna that receives the selected radio signal by controlling the switch device, the controller device adaptively controls the two changing devices so as to direct the main beam substantially to a direction of a desired wave and direct null substantially to a direction of an interference wave based on the combined radio signal outputted from the combining device.

In the above-mentioned adaptive antenna apparatus, the adaptive control circuit preferably includes two changing devices, a switch device, a combining device, and a controller device. The two changing devices changes at least one of an amplitude and a phase of each of the radio signals, and the switch device connects each one pair of antennas opposing to each other among the N antennas to the two changing devices, respectively. The combining device combines the radio signals outputted from the two changing devices, and outputs combined radio signals. Further, the controller device selects one of the combined radio signals according to a predetermined judgment criterion from among the combined radio signals outputted from the combining device when employing the each one pair of antennas opposing to each other by controlling the switch device, based on the respective combined radio signals outputted from the combining device. When employing the one pair of antennas opposing to each other and receiving the selected combined radio signal by controlling the switch device, the controller device adaptively controls the two changing devices so as to direct the main beam substantially to a direction of a desired wave and direct a null substantially to a direction of an interference wave based on the selected combined radio signal.

In the above-mentioned adaptive antenna apparatus, the adaptive control circuit preferably includes N changing devices, a switch device, a combining device, and a controller device. Each of the N changing devices changes at least one of an amplitude and a phase of each of N radio signals received by the N antennas, and the switch device connects the N antennas to the N changing devices, respectively. The combining device combines the radio signals outputted from the N changing devices, and outputs a combined radio signal. Further, the controller device selects one of the radio signals according to a predetermined judgment criterion from among the radio signals received by the respective antennas by controlling the switch device based on the combined radio signal outputted from the combining device. When employing the one pair of antennas opposing to each other and including the antenna that receives the selected radio signal by controlling the switch device, the controller device adaptively controls two changing devices connected to the employed one pair of antennas so as to direct the main beam substantially to a direction of a desired wave and direct a null substantially to a direction of an interference wave based on the combined radio signal outputted from the combining device.

In the above-mentioned adaptive antenna apparatus, the adaptive control circuit preferably includes N changing devices, a switch device, a combining device, and a controller device. Each of the N changing devices changes at least one of an amplitude and a phase of each of N radio signals received by the N antennas, respectively, and the switch device connects the N antennas to the N changing devices, respectively. The combining device combines the radio signals outputted from the N changing devices, and outputs a combined radio signal. Further, the controller device selects one of the respective combined radio signals according to a predetermined judgment criterion from among the respective combined radio signals outputted from the combining device when the each one pair of antennas opposing to each other are employed by controlling the switch device based on the combined radio signal outputted from the combining device. When employing the one pair of antennas opposing to each other and receiving the selected combined radio signal by controlling the switch device, the controller device adaptively controls two changing devices connected to the one pair of employed antennas so as to direct the main beam substantially to a direction of a desired wave and direct a null substantially to a direction of an interference wave based on the selected combined radio signal.

In the above-mentioned adaptive antenna apparatus, the adaptive control circuit preferably includes N changing devices, a switch device, a combining device, and a controller device. Each of the N changing devices changes at least one of an amplitude and a phase of each of N radio signals received by the N antennas, respectively, and the switch device connects the N antennas to the N changing devices, respectively. The combining device combines the radio signals outputted from the N changing devices, and outputs a combined radio signal. Further, the controller device selects one of the radio signals according to a predetermined judgment criterion from among the radio signals received by the respective antennas by controlling the switch device based on the radio signals outputted from the respective antennas. When employing the one pair of antennas opposing to each other and including the antenna that receives the selected radio signal by controlling the switch device, the controller device adaptively controls two changing devices connected to the employed one pair of antennas so as to direct the main beam substantially to a direction of a desired wave and direct a null substantially to a direction of an interference wave based on the combined radio signal outputted from the combining device.

In the above-mentioned adaptive antenna apparatus, the adaptive control circuit preferably includes N changing devices, a switch device, a combining device, and a controller device. Each of N changing devices changes at least one of an amplitude and a phase of each of N radio signals received by the N antennas, and the switch device connects the N antennas to the N changing devices, respectively. The combining device combines the radio signals outputted from the N changing devices, and outputs a combined radio signal. Further, the controller device selects one of the respective combined radio signals according to a predetermined judgment criterion from among the respective combined radio signals outputted from the combining device when employing the each one pair of antennas opposing to each other by controlling the switch device based on the radio signals outputted from the respective antennas. When employing the one pair of antennas opposing to each other and receiving the selected combined radio signal by controlling the switch device is employed, the controller device adaptively controls two changing devices connected to the employed one pair of antennas so as to direct the main beam substantially to a direction of a desired wave and direct a null substantially to a direction of an interference wave based on the selected combined radio signal.

In the above-mentioned adaptive antenna apparatus, the switch device preferably further connects the antennas other than the antennas connected to the respective changing devices to a predetermined load impedance.

In the above-mentioned adaptive antenna apparatus, the judgment criterion is preferably defined to select the radio signal for which a bit error rate of a baseband signal when the radio signal is demodulated is smaller. Alternatively, the judgment criterion is preferably defined to select the radio signal a received electric power of which is larger.

In the above-mentioned adaptive antenna apparatus, each of the N antennas is preferably a half-wavelength dipole antenna. Alternatively, each of the N antennas is preferably a one-wavelength patch antenna.

In the above-mentioned adaptive antenna apparatus, each of the N antennas is preferably an M-type antenna. In this case, each of the M-type antennas includes a radiation conductor, a feeding conductor connected to a central portion of the radiation conductor, and short-circuit conductors which are connected to both ends of the radiation conductors, respectively, and which are connected to a grounding conductor. The N M-type antennas are formed so as to share the short-circuit conductors between two adjacent M-type antennas among the N M-type antennas.

According to the adaptive antenna apparatus according to the present invention, it is possible to effectively and surely adaptively control the radio signal with a simpler structure, to attain the main beam gain, and to obtain the high suppressed amount of the interference wave, as compared with those of prior art. In particular, it is possible to set the maximum phase shift amount required for the adaptive control to be up to 90 degrees or less, and the adaptive control circuit connected to the respective antennas can be configured by using one 90-degree phase shifter.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 15 is a graph showing a radiation directional characteristic on an XY plane of the M-type antenna element 3a shown in FIG. 13 when a radio signal is fed to the M type antenna element 3a;

DETAILED DESCRIPTION OF THE PREFERRED EMBODIMENTS

Preferred embodiments of the present invention will be described hereinafter in detail with reference to the attached drawings. The components similar to those are denoted by the same numeral references.

First Preferred Embodiment

Figure 1:
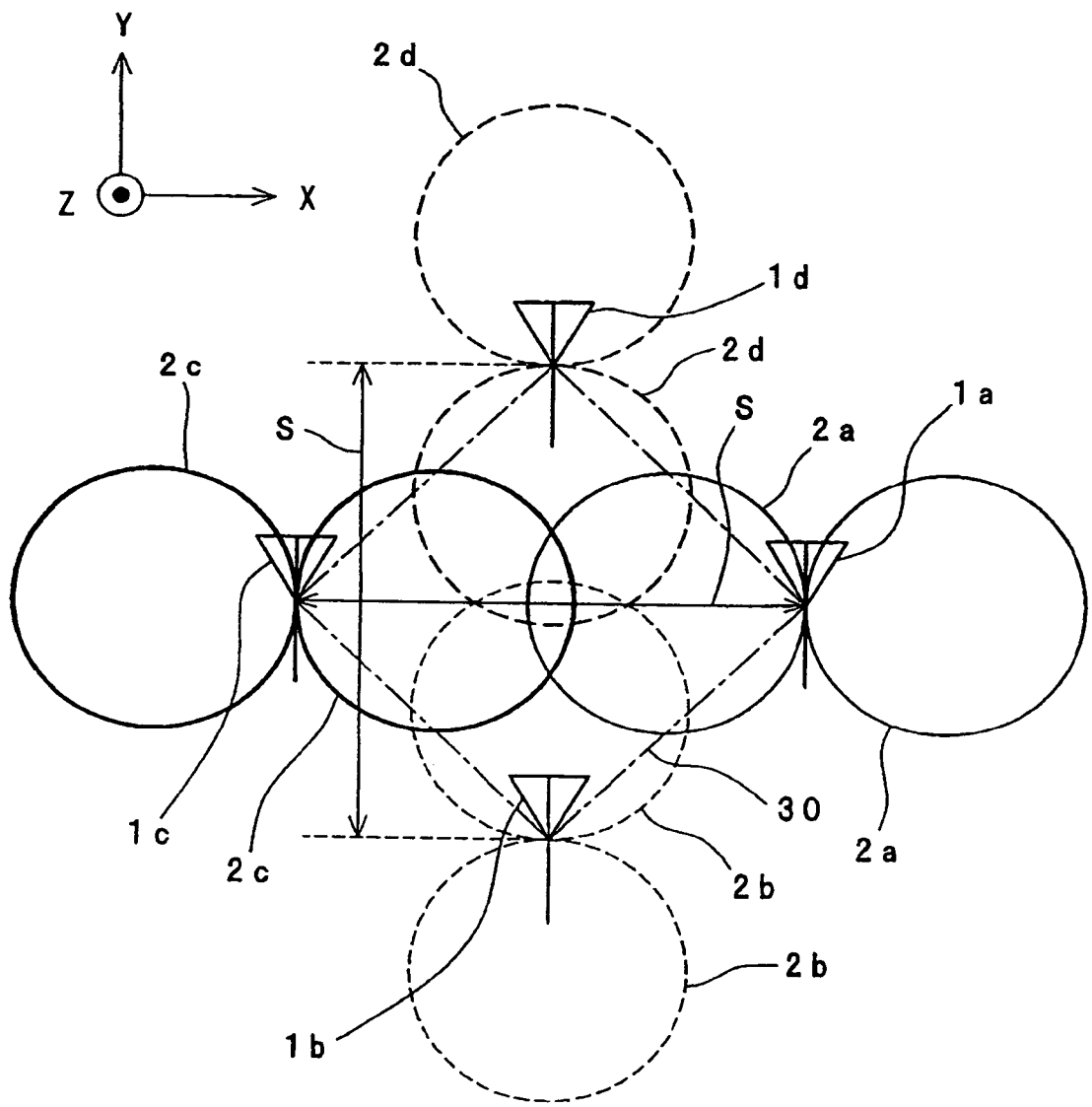
FIG. 1 is a plan view showing an antenna arrangement of an adaptive antenna apparatus according to a first preferred embodiment of the present invention.

FIG. 1 is a plan view showing an antenna arrangement of an adaptive antenna apparatus according to a first preferred embodiment of the present invention. The adaptive antenna apparatus according to the present preferred embodiment is characterized by including four antennas 1a, 1b, 1c and 1d, each of, for example, a half-wavelength dipole antenna, where the four antennas 1a, 1b, 1c and 1d have radiation patterns 2a, 2b, 2c and 2d each of bidirectional characteristic, respectively. The four antennas are provided at vertexes of a square 30, respectively, and the adaptive antenna apparatus executes adaptive control using selectively any one pair of a first pair of antennas 1a and 1c opposing to each other and a second pair of antennas 1b and 1d opposing to each other.

Referring to FIG. 1, a virtual square 30 is provided on an XY plane formed by an X-axis and a Y-axis orthogonal to each other, and the four antennas 1a, 1b, 1c and 1d are provided at positions of the respective vertexes of the square 30. A Z-axis orthogonal to both the X-axis and the Y-axis is located at an intersecting point between two diagonals of the square 30, that is, at a center of the square 30. As for the four antennas 1a, 1b, 1c and 1d, the first pair of antennas 1a and 1c are arranged so as to be separated from each other by a predetermined interval S between the antennas so that a direction of a main beam of the bidirectional characteristic of each of the antennas 1a and 1c (the main beam is defined hereinafter as a radiation beam having a highest radiation intensity in the directional characteristic) is parallel to the X-axial direction. In addition, the second pair of antennas 1b and 1d are arranged so as to be separated from each other by the predetermined interval S between the antennas so that a direction of a main beam of the bidirectional characteristic of each of the antennas 1b and 1d is parallel to the Y-axial direction.

The interval S between the antennas is coincident with a length of the diagonal of the square 30.

Accordingly, the antenna 1*a* is arranged at a position in a +X-axial direction, the antenna 1*b* is arranged at a position in a −Y-axial direction, the antenna 1*c* is arranged at a position in a −X-axial direction, and the antenna 1*d* is arranged at a position in a +Y-axial direction. Further, the antenna 1*a* has the radiation pattern 2*a* of the bidirectional characteristic having main beams in ±X-axial directions, and the antenna 1*b* has the radiation pattern 2*b* of the bidirectional characteristic having main beams in ±Y-axial directions. In addition, the antenna 1*c* has the radiation pattern 2*c* of the bidirectional characteristic having main beams in ±X-axial directions, and the antenna 1*d* has the radiation pattern 2*d* of the bidirectional characteristic having main beams in ±Y-axial directions. In the present preferred embodiment, one example of the adaptive antenna apparatus that employs the four antennas 1*a*, 1*b*, 1*c* and 1*d* is shown. In the following description, an operation executed by the adaptive antenna apparatus in respect of reception of a radio wave of a radio signal will be described.

The adaptive antenna apparatus utilizes a technique for substantially maximizing the gain of the radiation pattern of the antenna in an arrival direction of a desired radio signal wave, with substantially making the gain of the radiation pattern null in a direction of an interference wave that interferes with the desired wave, thereby realizing a stable radio communication. Normally, the adaptive antenna apparatus includes a variable amplifier and a phase shifter for each antenna, gives an amplitude difference and a phase difference between the antennas, and this leads to realization of the maximum desired signal electric power and a minimum interference signal electric power. The adaptive antenna apparatus according to the present preferred embodiment is characterized by adding a configuration of a sector antenna apparatus to that of an ordinary adaptive antenna apparatus.

The sector antenna apparatus is constituted by pairs of antennas, each pair of which covers each space among the respective spaces obtained by dividing a space on a horizontal plane or a vertical plane for the directional characteristic. By dividing the space, a radiation direction of the radio wave of each radio signal can be narrowed down, a directional characteristic having a relatively high gain in the main beam direction can be realized, and a high sensitivity can be obtained. Accordingly, an ordinary sector antenna apparatus is required to include antennas as many as sectors, and only the antenna that receives the radio wave of the radio signal at a highest intensity is connected to a radio signal processing circuit through a signal terminal and a feeding cable so that the antenna can operate. As shown in FIG. 1, the adaptive antenna apparatus according to the present preferred embodiment employs, as the sector antennas, the bidirectional antennas. In other words, the adaptive antenna apparatus takes the adaptive control using the two bidirectional antennas that oppose to each other, realizes the high sensitivity by the operation of the sector antennas, and realizes maximization of the electric power of the desired signal and minimization of the electric power of the interference wave by further improving the sensitivity by the operation of the adaptive antenna apparatus.

Figure 2:
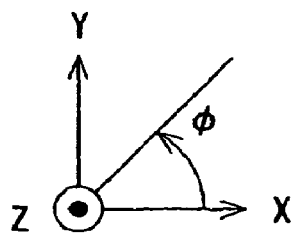
FIG. 2 is a plan view showing an antenna arrangement of the adaptive antenna apparatus of FIG. 1 using two antennas 1a and 1b each of a half-wavelength dipole antenna.
Figure 2:
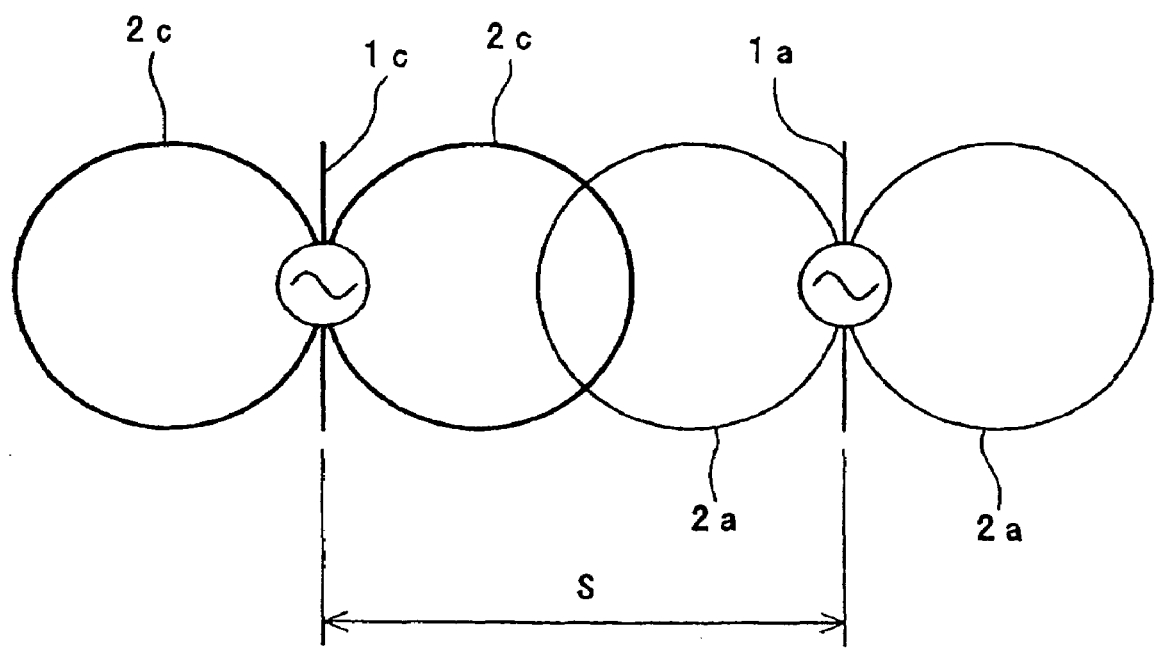

FIG. 2 is a plan view showing an antenna arrangement of the adaptive antenna apparatus when the apparatus shown in FIG. 1 employs the two antennas 1*a* and 1*c*, each of a half-wavelength dipole antenna. In other words, one example of controlling the radiation patterns of the two half-wavelength dipole antennas shown in FIG. 2, using the two antennas as one example of the antennas each having the bidirectional characteristic, will be described below.

Referring to FIG. 2, the half-wavelength dipole antenna 1*a* is provided so that two antenna elements of the half-wavelength dipole antenna 1*a* are parallel to the Y-axis. The half-wavelength dipole antenna 1*c* is provided so that two antenna elements of the half-wavelength dipole antenna 1*c* are parallel to the Y-axis. That is, the half-wavelength dipole antennas 1*a* and 1*c* are provided so that the antenna elements of the half-wavelength dipole antennas 1*a* and 1*c* are parallel to one another, and so that the antennas 1*a* and 1*c* are separated from each other by the interval S between the antennas. The required characteristics of the adaptive antenna apparatus are as follows. First of all, when the interference wave is present, the adaptive antenna apparatus greatly reduces the interference wave. Secondly, when the interference wave is not present, the adaptive antenna apparatus exhibits the directional characteristic that includes a main beam having a higher gain in the direction of the desired wave. Accordingly, the interference wave suppression effect will first be considered. Next, a configuration of the adaptive antenna apparatus that is capable of obtaining the directional characteristic including the main beam having the higher gain in the desired wave direction will be considered. It is assumed in the following considerations that the desired wave and the interference wave are equal in amplitude to each other, and that the amplitude of a noise 0.001 as high as that of the desired wave.

The detailed operation executed by the adaptive antenna apparatus will be described.

Each of the antennas 1*a*, 1*b*, 1*c* and 1*d* receives not only a signal of the desired wave but also a thermal noise component. Further, each antenna sometimes receives the interference wave on the same channel at the same frequency from an adjacent base station, and a delayed wave which is the desired wave but has a time delay due to arrival via a relatively long path. In an analog radio communication of a television, a radio or the like, the delayed wave degrades a screen display quality as a ghost of, for example, a television image. In a digital radio communication, the thermal noise, the interference wave on the same channel, and the delayed wave influence the desired wave as bit errors and directly degrade the signal quality. If it is assumed herein that a received electric power of the desired wave is C, a received electric power of the thermal noise is N, and an electric power of the interference wave including the interference wave on the same channel and the delayed wave is I, the adaptive antenna apparatus operates to substantially maximize, for example, C/(N+I) so as to improve the signal quality.

Figure 3:
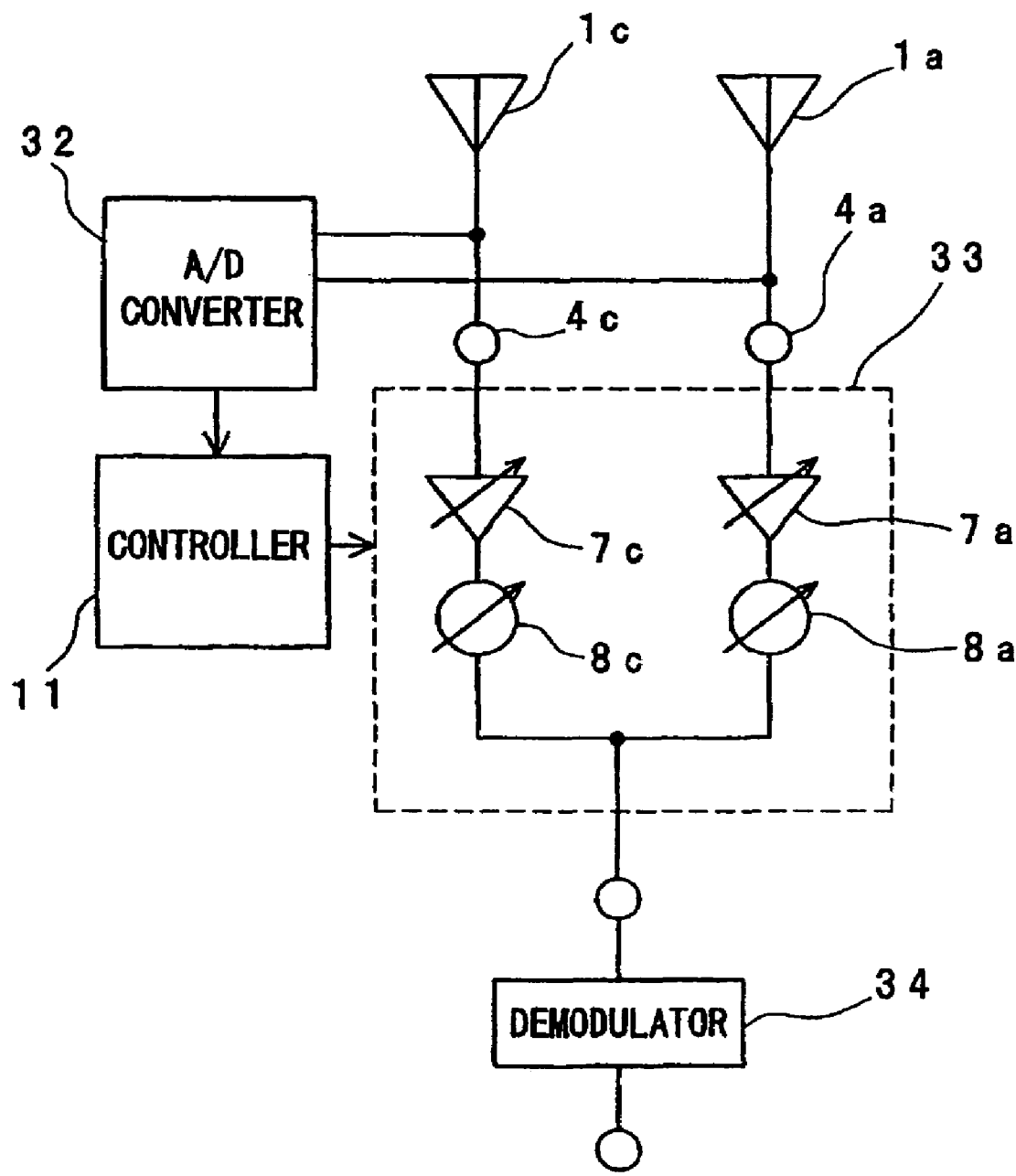
FIG. 3 is a block diagram showing an adaptive control circuit for the adaptive antenna apparatus in the antenna arrangement of FIG. 2.

FIG. 3 is a block diagram showing an adaptive control circuit for the adaptive antenna apparatus in the antenna arrangement shown in FIG. 2. The operation executed by the adaptive antenna apparatus will be described specifically with reference to FIG. 3. By way of example, the operation will be described when the paired antennas 1*a* and 1*c* oppose to each other are used. The radio signals received by the respective antennas 1*a* and 1*c* are converted into a digital signal x(t) (where x(t) is a signal vector having two elements) by an A/D converter 32, and then, it is inputted to a controller 11. The controller 11 controls amplification factors or attenuation factors of variable amplifiers 7*a* and 7*c* in a reception adaptive control circuit 33, and phase shift amounts of phase shifters 8*a* and 8*c* in the reception adaptive control circuit 33 so that a radio signal y(t) outputted from the reception adaptive control circuit 33 has the highest signal quality (that is, as will be described later in detail, so that a combined received electric power is the highest or a bit error rate of a demodulated baseband signal is the lowest). Then, this leads to that the demodulated signal outputted from a demodulator 6 has the highest signal quality.

Next, a method for calculating the amplification factors or attenuation factors of the variable amplifiers 7a and 7c and the phase shift amounts of the phase shifters 8a and 8c (respective values will be generically referred to as a weight coefficients hereinafter) will be described. A weight coefficient $W_i$ is defined by the following Equation (1), where $A_i$ denotes an amplification amount and $\phi_i$ denotes a phase:

$$W_i = A_i \exp(j\omega\phi_i) \qquad (1).$$

In the Equation (1), j denotes an imaginary unit and $\omega(=2\pi f)$ denotes an angular frequency. In addition, i is 1 or 2, i=1 denotes a value for a circuit connected to the antenna 1a, and i=2 denotes a value for a circuit connected to the antenna 1c. Further, a weight coefficient vector W including the weight coefficient $W_i$ as an element is defined. A method for obtaining the weight coefficient vector W will next be described.

Several methods have been known to those skilled in the art for obtaining the weight coefficient vector W. In the present preferred embodiment, an example of using a steepest descent method (referred to as an LMS (Least Means Square) Method hereinafter) will be described. If this method is used, the adaptive antenna apparatus holds a signal sequence r(t) (referred to as a reference signal hereinafter) included in a known desired wave in advance, and controls a received signal to be close to the reference signal r(t). By way of example, one example in which the controller 11 stores the reference signal in advance will be described. Concretely, the controller 11 multiplies the radio digital signal x(t) by the weight coefficient w(t) that includes an amplitude component and a phase component, and calculates a residual between a multiplication result and the reference signal r(t). In this case, the residual e(t) is represented by the following Equation (2):

$$e(t) = r(t) - w(t) \times x(t) \qquad (2).$$

The residual e(t) is a positive value or a negative value. Accordingly, the minimum of a value that is a square of the residual e(t) obtained by the Equation (2) is recurrently and repeatedly calculated. Namely, a weight coefficient w(t, m+1) obtained by calculating repeatedly the (m+1) times is represented by the following Equation (3) using an $m^{th}$ weight coefficient w(t, m):

$$w(t, m+1) = w(t, m) + u \times x(t) \times e(t, m) \qquad (3).$$

In the Equation (3), "u" is referred to as a step size. When the step size "u" is larger, the number of times of the repetitive calculation for allowing the weight coefficient w(t, m) to converge into the minimum is advantageously smaller. However, when the step size "u" is excessively large, the weight coefficient disadvantageously oscillates near the minimum. Accordingly, it is necessary to give due consideration to selection of the step size "u". Conversely, when the step size "u" is smaller, the weight coefficient w(t, m) stably converges into the minimum. However, the number of times of the repetitive calculation increases. When the number of times of the repetitive calculation increases, it takes longer time to calculate the weight coefficient w(t, m). Provided that a calculation time for the weight coefficient w(t, m) is longer than a surrounding environment change time (e.g., several milliseconds), the signal quality cannot be improved by this weight coefficient w(t, m). Accordingly, it is necessary to select convergence conditions as fast as possible and as stable as possible when determining the step size "u". Further, the residual e(t, m) is represented by the following Equation (4):

$$e(t, m) = r(t) - w(t, m) \times x(t) \qquad (4).$$

Using the value of the Equation (4), the Equation (3) is recurrently updated. It is noted that the largest number of times of the repetitive calculation for the weight coefficient w(t, m) is set so that the weight coefficient calculation time is not longer than a radio system switching time.

A judgment method for use in the radio communication system based on the steepest descent method has been described herein by way of example. However, the judgment method is not limited to this. For example, an RLS (Recursive Least-Squares) method, an SMI (Sample Matrix Inversion) method, or the like capable of making a faster judgment may be used to calculate the weight coefficient vector. Although any one of these methods enables the faster judgment, the calculation in the judgment processing executed by the controller 11 is made more complex. In addition, when signal sequence modulation is digital phase modulation and low envelope modulation having a constant envelope, a CMA (Constant Modulus Algorithm) method can be used.

The results of a simulation conducted by the inventors of the present invention using the adaptive antenna apparatus shown in FIGS. 1 and 2 will be described below.

Figure 4:
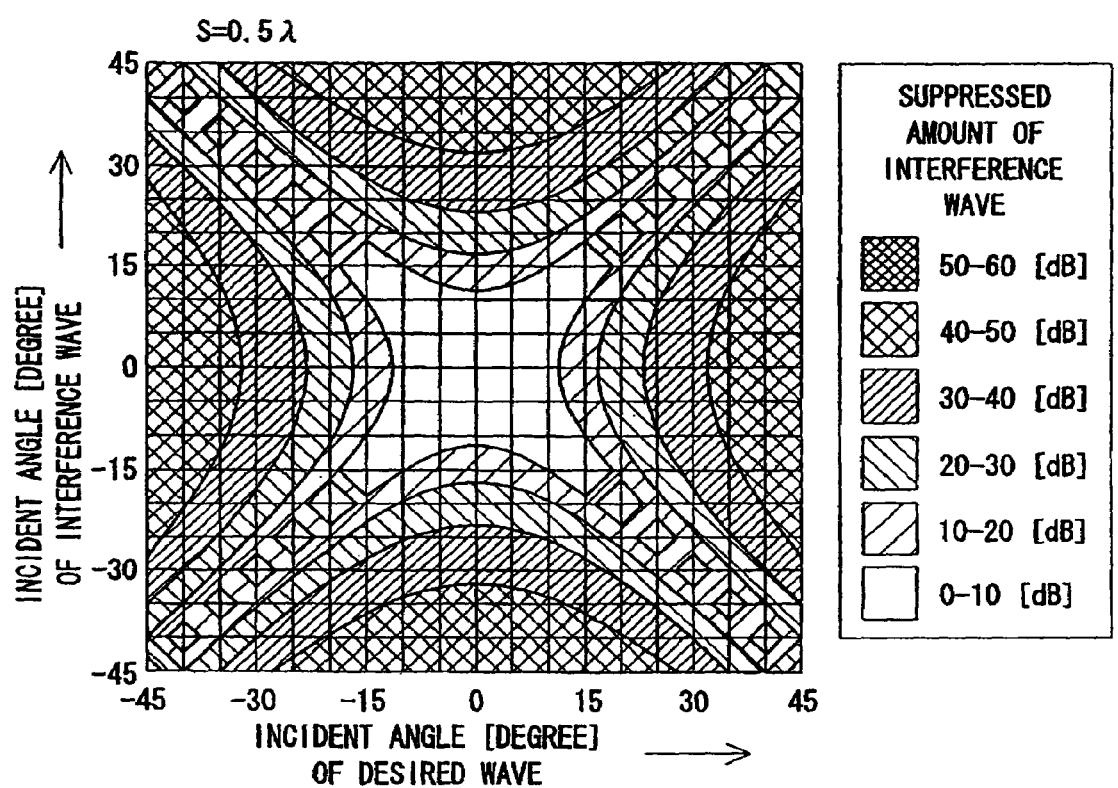
FIG. 4 is a graph showing a suppressed amount of an interference wave by an adaptive control when an incident angle of a desired wave and an incident angle of an interference wave are set in the case of an interval S between the antennas of half the wavelength.

FIG. 4 is a graph showing a suppressed amount of the interference wave under the adaptive control when the incident angles of the desired wave and the interference wave are set in the case of an interval S between the antennas of half the wavelength. In each drawing, one wavelength is denoted by λ. As indicated by an azimuth φ shown in FIG. 2, the incident angle directed from the +X-axis toward the +Y-axis is positive, and this shall apply hereafter. With the configuration of the adaptive antenna apparatus according to the present preferred embodiment, the four antennas 1a, 1b, 1c and 1d each exhibiting the bidirectional characteristic are employed. Therefore, an angle area covered by each of the antennas 1a, 1b, 1c and 1d is ±45 degrees. As is apparent from FIG. 4, the suppressed amount of the interference wave is substantially equal to that obtained by the prior art adaptive antenna apparatus constituted by the omni-directional antennas shown in FIG. 32. It is also apparent from FIG. 4 that the interference wave is difficult to suppress when the difference between the incident angle of the desired wave and that of the interference wave is equal to or smaller than five degrees. When the difference between the incident angle of the desired wave and that of the interference wave is equal to or smaller than five degrees, the interference wave suppression effect is small. Accordingly, this angle difference range is not considered and ignored so that it is out of the control range of the adaptive antenna apparatus.

Next, the phase shift amounts of the phase shifters 8a and 8c required for the interference wave suppression operation of the adaptive antenna apparatus are checked. By way of example, the results of changing the incident angle of the interference wave when the incident angle of the desired wave is zero degree are shown in FIG. 5.

Figure 5:
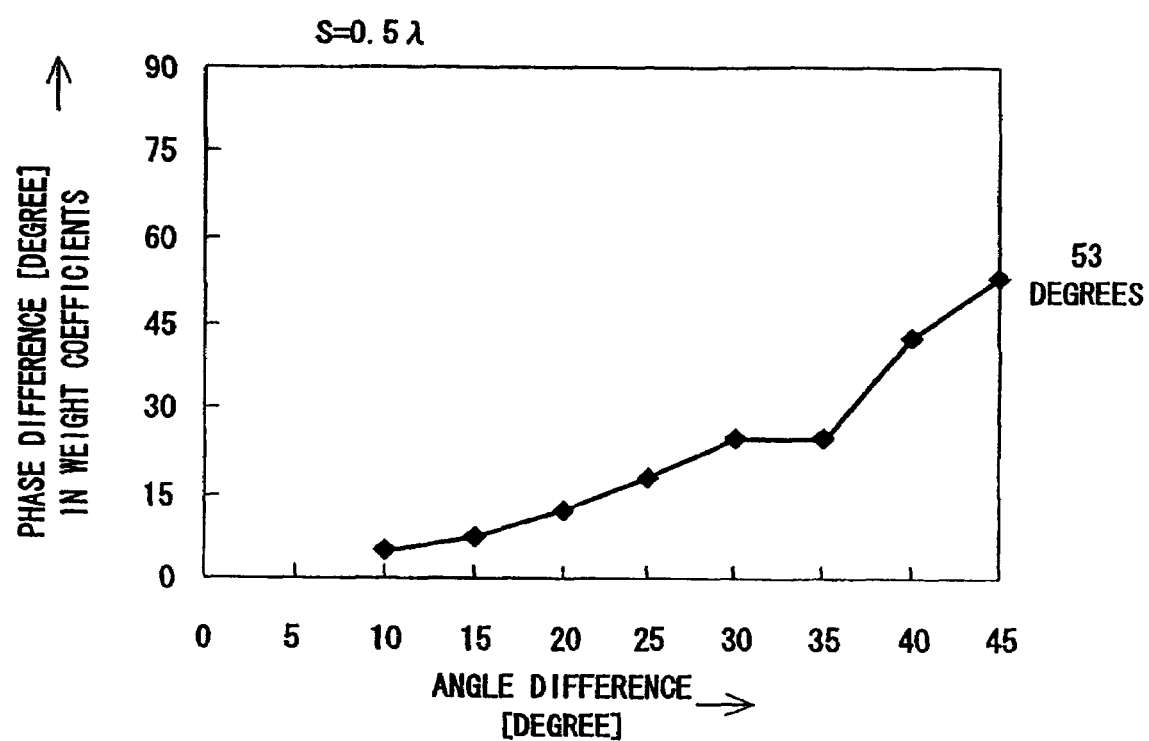
FIG. 5 is a graph showing a phase difference in weight coefficients relative to an angle difference between the desired wave and the interference wave when the interval S between the antennas is half the wavelength in the case of FIG. 2.
Figure 35:
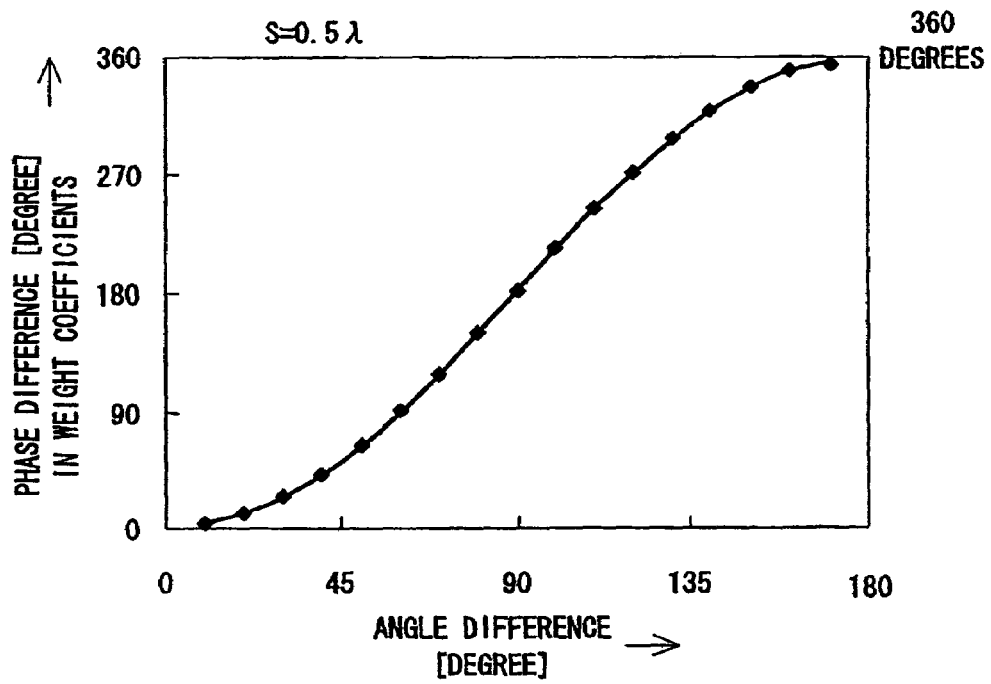
FIG. 35 is a graph showing a phase difference in weight coefficients relative to an angle difference between the desired wave and the interference wave when the interval S between the antennas is half the wavelength in the case of FIG. 33.
Figure 36:
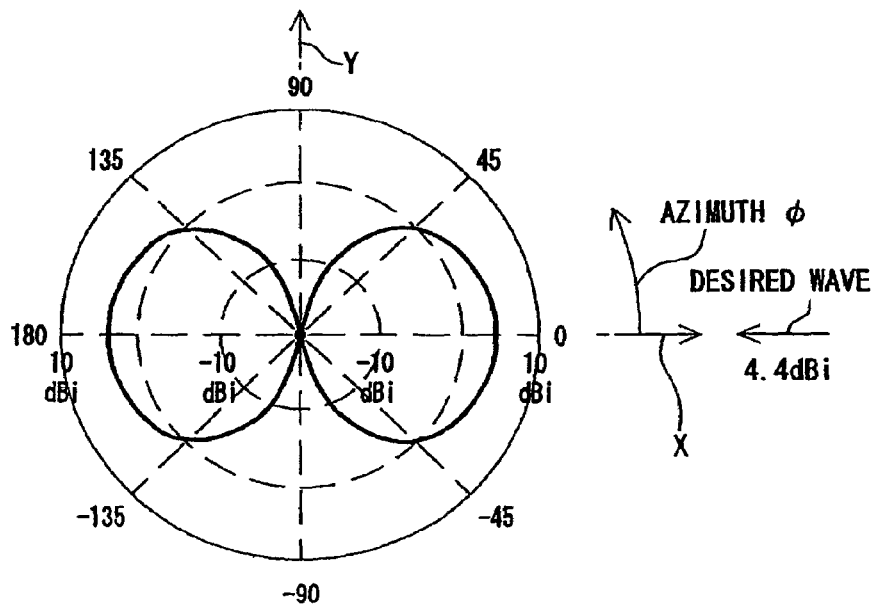
FIG. 36 is a graph showing a directional characteristic on an XY plane when a desired wave arrives from an X-axial direction in the case of an interval S between the antennas of half the wavelength and the case of FIG. 33.

Referring to FIG. 5, a horizontal axis indicates the angle difference between the incident angle of the interference wave and that of the desired wave, and a vertical axis indicates the phase difference between the phase of the weight coefficient required for the antenna 1c and the phase of the weight coefficient required for the antenna 1a. As is apparent from FIG. 5, the maximum phase difference between the antennas 1a and 1c in weight coefficients is 53 degrees for the adaptive antenna apparatus according to the present preferred embodiment. For the adaptive antenna apparatus constituted by the omni-directional antenna apparatus, the phase difference of 360 degrees is required as shown in FIG. 35. That is, as compared with the prior art adaptive antenna apparatus, the required phase difference can be reduced to one-seventh. In addition, when the incident angles of the desired wave and the interference wave are changed from −45 degrees to +45 degrees, the maximum phase difference between the phase of the antenna $1c$ and that of the antenna $1a$ is 53.4 degrees.

As can be seen from above, by employing the adaptive antenna apparatus that uses the two bidirectional antennas, the phase difference between the antennas can be reduced when maintaining the interference wave suppression effect. As a result, required specifications of the phase shift amounts for the phase shifters $8a$ and $8c$ can be made less strict.

Next, it will be considered whether the adaptive antenna apparatus according to the present preferred embodiment can exhibit the directional characteristic having a higher gain in the main beam direction with no interference wave. The adaptive antenna apparatus using the half-wavelength dipole antennas shown in FIG. 2 narrows down the radiation direction, as compared with that of the adaptive antenna apparatus using the omni-directional antennas. Due to this, in the adaptive antenna apparatus according to the present preferred embodiment, the electric power of the radio wave of the radiated radio signal is stronger by 2.15 dB in a maximum direction that is the main beam direction. Namely, by employing the dipole antennas in the adaptive antenna apparatus, the radio wave of the radio signal can be larger, i.e., the amplification ratio can be made 1.28 times higher than the adaptive antenna apparatus using the omni-directional antennas. Due to this, when the radio waves of the radio signals radiated from the two antennas $1a$ and $1c$, for example, are added up at the same phase, a gain of 6.55 times which is times of a square of (1.28+1.28), as high as that of a single omni-directional antenna (a gain of 8.16 dBi) can be obtained in the main beam direction. Further, when the adaptive antenna apparatus is constituted by using the two omni-directional antennas, a gain of four times which is the times of a square of (1+1), as high as that of the single omni-directional antenna (a gain of 6.01 dBi) can be obtained in the main beam direction.

As described above, the adaptive antenna apparatus that includes the bidirectional antennas can exhibit the directional characteristic having the gain that is 6.55/4=1.65 times higher, i.e., by 2.15 dB, than the gain of the adaptive antenna apparatus that includes the omni-directional antennas. Further, by replacing the bidirectional antennas shown in FIG. 1 with the omni-directional antennas, respectively, and by adjusting the amplitudes and the phases of the four omni-directional antennas, substantially the same directional characteristic as that of the adaptive antenna apparatus that includes the bidirectional antennas according to the present preferred embodiment can be attained. However, in this case, such disadvantages that it is necessary to provide a variable amplifier and a phase shifter for each antenna, lots of cost is required, and the arrangement is not suited for the reduction in the size of the apparatus occur. In other words, if the adaptive antenna apparatus constituted according to the present preferred embodiment is used, the number of antennas to be controlled becomes smaller. Accordingly, the adaptive antenna apparatus according to the present preferred embodiment has such an advantageous effect as the reduction in the size of the radio apparatus and the reduction in cost.

Figure 6:
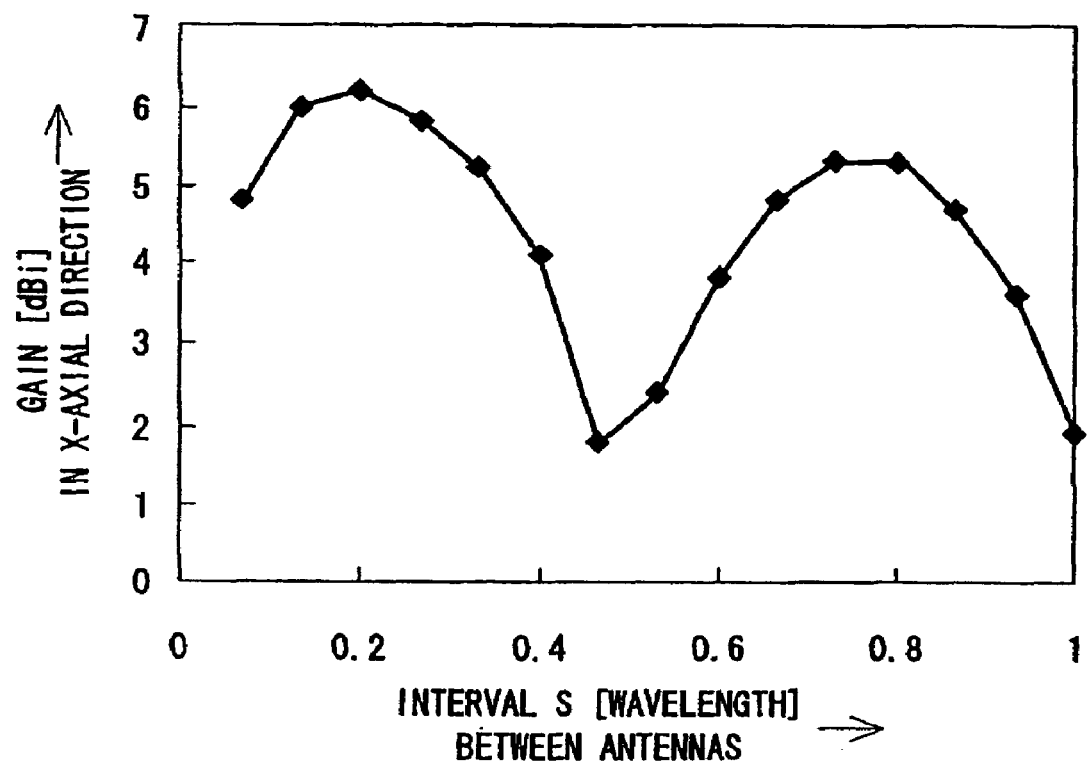
FIG. 6 is a graph showing a gain in an X-axial direction relative to the interval S between the antennas when the interval S between the antennas is half the wavelength in the case of FIG. 2.

FIG. 6 is a graph showing a gain in the X-axial direction relative to the interval S between the antennas in the case of an interval S of half the wavelength. Namely, FIG. 6 shows results of obtaining the gain in the +X-axial direction when the interval S between the antennas is changed, thereby obtaining an optimum interval S between the antennas. In FIG. 6, the phase difference between the radio signal received by the antenna $1a$ and that received by the antenna $1c$ is set to 90 degrees. In FIG. 6, when the interval S between the antennas is in a range from zero wavelengths to 0.5 wavelengths, the phase of the radio signal received by the antenna $1c$ is shifted by 90 degrees so as to be ahead of the phase of the radio signal received by the antenna $1a$. When the interval S between the antennas is equal to or wider than 0.5 wavelengths, the phase of the radio signal received by the antenna $1c$ is shifted by 90 degrees so as to be behind the phase of the radio signal received by the antenna $1a$. At that time, the +X-axial direction corresponds to the maximum radiation direction (the main beam direction) in the respective the interval S between the antennas.

As is apparent from FIG. 6, when the interval S between the antennas is in a range between 0.2 wavelengths and 0.3 wavelengths (substantially 0.25 wavelengths) and between 0.7 wavelengths and 0.8 wavelengths (substantially about 0.75 wavelengths), maximal gains can be obtained, respectively. When the interval S between the antennas is 0.2 wavelengths, the gain of 6.2 dBi can be obtained. When the interval S between the antennas is 0.8 wavelengths, the gain of 5.3 dBi can be obtained. Further, when the interval S between the antennas is 0.5 wavelengths and one wavelength, minimal gains of 2.4 dBi and 1.9 dBi are obtained, respectively. This indicates that when "the interval S between the antennas is an integer multiple of (¼ wavelengths)+(½ wavelengths)", the gain in the +X-axial direction is a maximal value, and that when the interval S is an integer multiple of the ½ wavelengths, the gain in the +X-axial direction is a minimal value.

Figure 7:
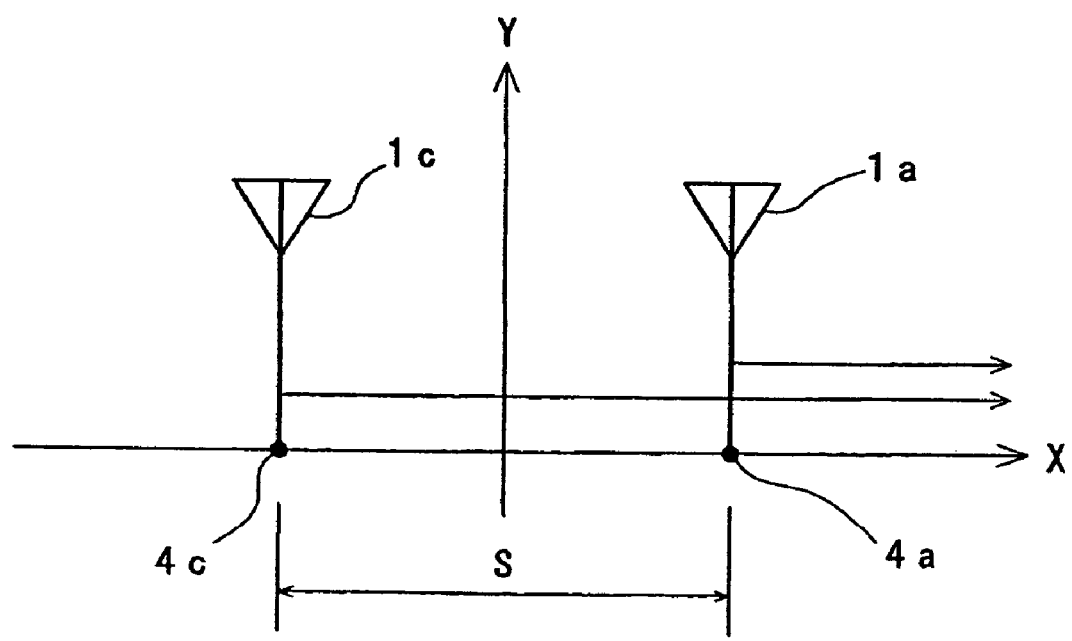
FIG. 7 is a plan view showing an antenna arrangement for describing the operation in the case of FIG. 6.

The results of FIG. 6 will be theoretically considered with reference to FIG. 7.

As described above, when the interval S between the antennas is in a range from zero wavelengths to 0.5 wavelengths, the radio signal radiated from the antenna $1c$ is 90 degrees ahead of the radio signal radiated from the antenna $1a$ in phase. At that time, as shown in FIG. 7, it is when the radio wave of the radio signal radiated from the antenna $1c$ and that of the radio signal radiated from the antenna $1a$ are added up at the same phase in the +X-axial direction that the radio wave of the radio signal is radiated at the strongest intensity in the X-axial direction. Namely, the radio wave of the radio signal radiated from the antenna $1c$, which is propagated to the antenna $1a$, needs to be 90 degrees behind the radio wave of the radio signal from the antenna $1a$ in phase. By causing the phase delay, the phase of the radio wave of the radio signal radiated from the antenna $1a$ in the +X-axial direction is equal to that of the radio wave of the radio signal radiated from the antenna $1c$ in the +X-axial direction at the same time. Conversely, the radio wave of the radio signal radiated from the antenna $1c$ is opposite in phase to the radio wave of the radio signal radiated from the antenna $1a$ in the −X-axial direction. As a result, the radio wave of the radio signal is not radiated in the −X-axial direction. Namely, when the interval S between the antennas is 0.25 wavelength, the directional characteristic in the +X-axial direction has the highest gain. On the other hand, when the interval S between the antennas is in a range from 0.5 wavelengths to one wavelength, the phase of the radio signal radiated from the antenna $1c$ is 90 degrees behind the phase of the radio signal radiated from the antenna $1a$. At that time, in a manner similar to that of above, in order to radiate the radio wave of the radio signal at the strongest intensity in the X-axial direction, the radio wave of the radio signal radiated from the antenna $1c$, which is propagated to the antenna $1a$, needs to be 270 degrees behind (−90 degrees ahead of) the radio wave of the radio signal radiated from the antenna $1a$. In other words, when the interval S between the antennas is 0.75 wavelengths, the directional characteristic in the +X-axial direction has the highest gain. This coincides with the results of FIG. 6. Accordingly, it is preferable to set "the interval S between the antennas to an integer multiple of (¼ wavelengths)+(½ wavelengths)".

Referring to FIG. 6, a gain decrease due to an isolation between the antennas 1a and 1c is added. This isolation is represented by a ratio of an electric power received by the antenna 1c to the electric power of the radio wave of the radio signal radiated from the antenna 1a. That is, the gain decreases since the electric power corresponding to this isolation ratio is not radiated. When the isolation is, for example, 10 dB, an efficiency of the radio waves of the radio signals radiated from the antennas 1a and 1c is 90%.

Figure 8:
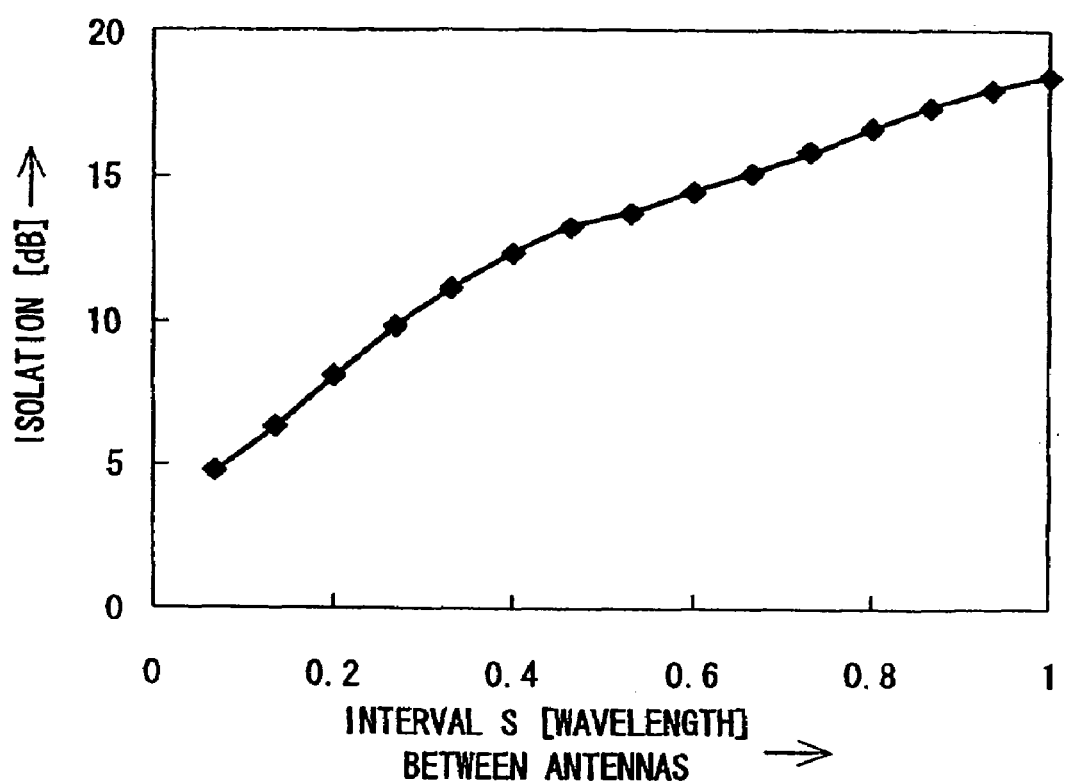
FIG. 8 is a graph showing an isolation between the two antennas 1a and 1c relative to the interval S between the antennas in the case of FIG. 2.

FIG. 8 is a graph showing an isolation between the two antennas 1a and 1c relative to the interval S between the antennas shown in FIG. 2. As is apparent from FIG. 8, as the interval S between the antennas is larger, the isolation is higher. In addition, if the isolation is equal to or higher than 10 dB, the interval S between the antennas needs to be equal to or larger than 0.3 wavelengths. Therefore, if the interval S between the antennas is set to either 0.75 wavelengths or 0.8 wavelengths (=(about ¼ wavelengths)+(½ wavelengths)), then it is possible to obtain relatively higher isolation, good efficiency, and relatively high antenna gain. Accordingly, it is preferable to set the interval S between the antennas to either 0.75 wavelengths or 0.8 wavelengths (=(about ¼ wavelengths)+(½ wavelengths)).

Figure 9:
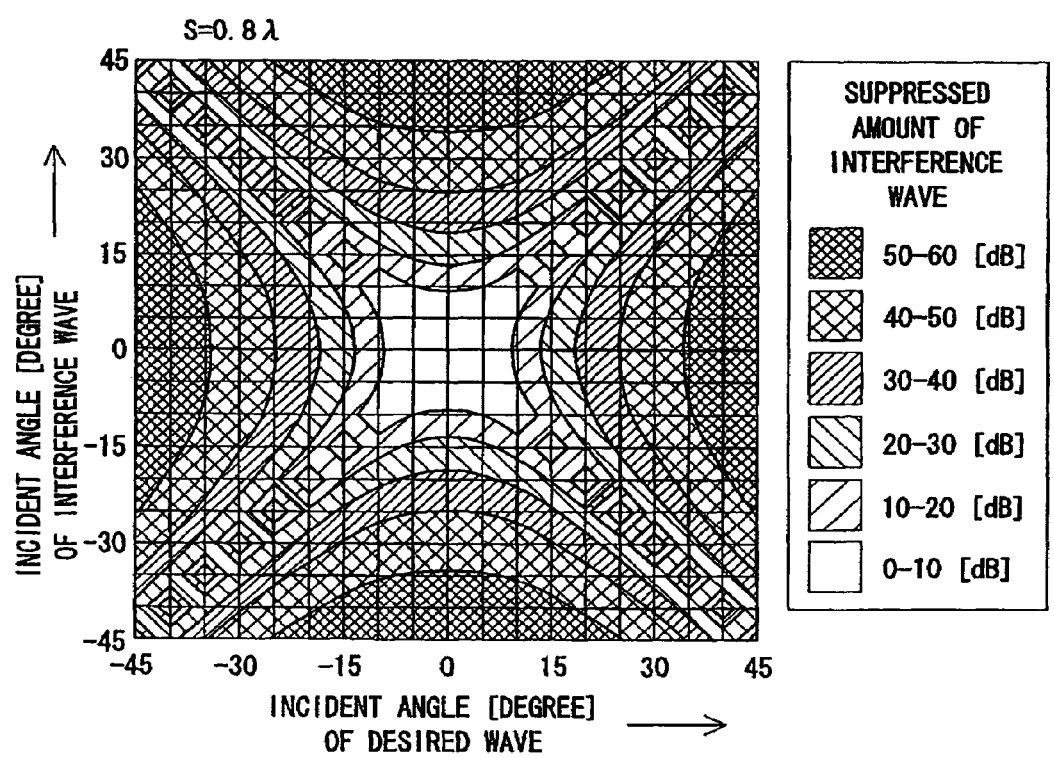
FIG. 9 is a graph showing a suppressed amount of the interference wave under the adaptive control when the incident angle of the desired wave and the incident angle of the interference wave are set in the case of an interval S between the antennas of 0.8 wavelengths and the case of FIG. 2.

FIG. 9 is a graph showing a suppressed amount of the interference wave under the adaptive control when the incident angles of the desired wave and the interference wave are set in the case of an interval S between the antennas of 0.8 wavelengths. As is apparent from FIG. 9, the large suppressed amount of the interference wave is obtained as compared with the instance in which the interval S between the antennas is 0.5 wavelengths shown in FIG. 4. In this case, in a manner similar to that of the instance of FIG. 4, the interference wave is difficult to suppress when the difference between the incident angle of the desired wave and that of the interference wave is equal to or smaller than five degrees. When the difference between the incident angle of the desired wave and that of the interference wave is equal to or smaller than five degrees, the interference wave suppression effect is small. Accordingly, this angle difference range is not considered and ignored as out of the control range of the adaptive antenna apparatus.

Next, the phase shift amount of the phase shifters required for the interference wave suppression operation executed by the adaptive antenna apparatus in the case of an interval between the antennas of 0.8 wavelengths will be examined. The phase difference in weight coefficient between the antennas 1c and 1a within the control range of the adaptive antenna apparatus is in a range between 250.5 degrees and 336.8 degrees. This shows that the phase shift amount required for the phase shifters 8a and 8c is 86.3 degrees and can be reduced to a quarter of that for the adaptive antenna apparatus constituted by the omni-directional antennas.

Figure 10:
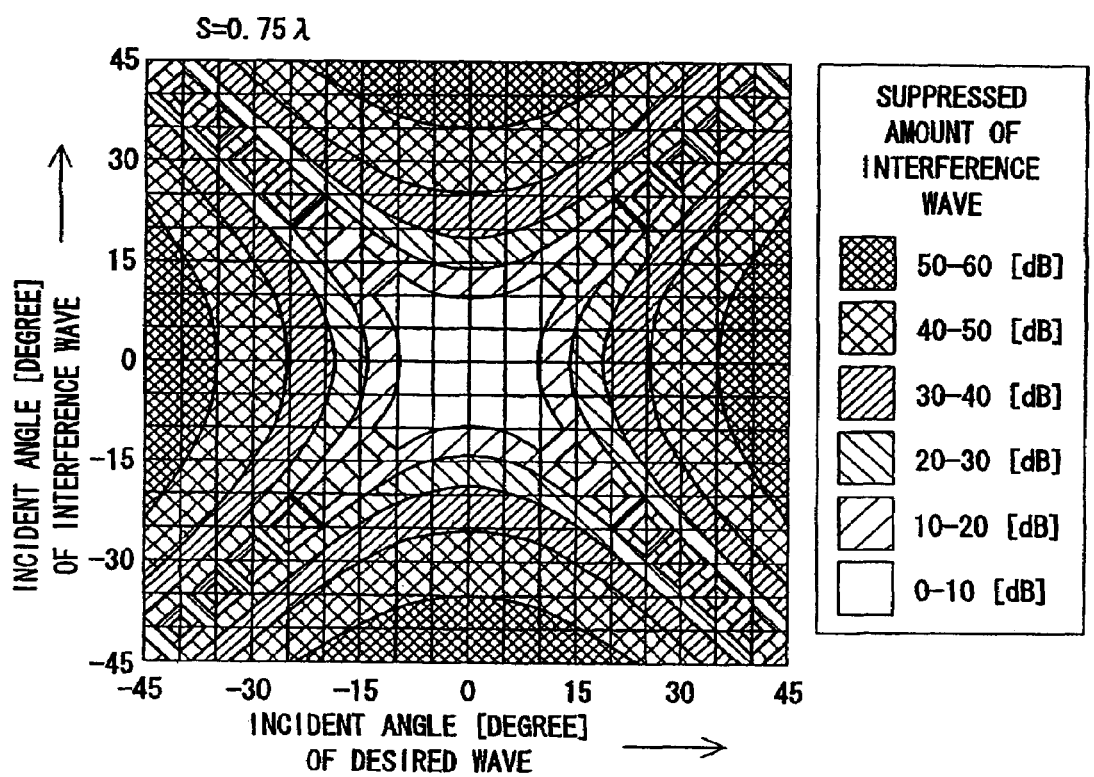
FIG. 10 is a graph showing a suppressed amount of the interference wave under the adaptive control when the incident angle of the desired wave and the incident angle of the interference wave are set in the case of an interval S between the antennas of 0.75 wavelengths and the case of FIG. 2.

FIG. 10 is a graph showing a suppressed amount of the interference wave under the adaptive control when the incident angles of the desired wave and the interference wave are set in the case of an interval S between the antennas of 0.75 wavelengths. As is apparent from FIG. 10, the large suppressed amount of the interference wave is obtained as compared with the instance in which the interval S between the antennas is 0.5 wavelengths shown in FIG. 4 and the instance in which the interval S between the antennas is 0.8 wavelengths shown in FIG. 9. In this case, in a manner similar to that of the instance of FIG. 4, the interference wave is difficult to suppress when the difference between the incident angle of the desired wave and that of the interference wave is equal to or smaller than five degrees. When the difference between the incident angle of the desired wave and that of the interference wave is equal to or smaller than five degrees, the interference wave suppression effect is small. Accordingly, this angle difference range is not considered and ignored as out of the control range of the adaptive antenna apparatus.

Figure 11:
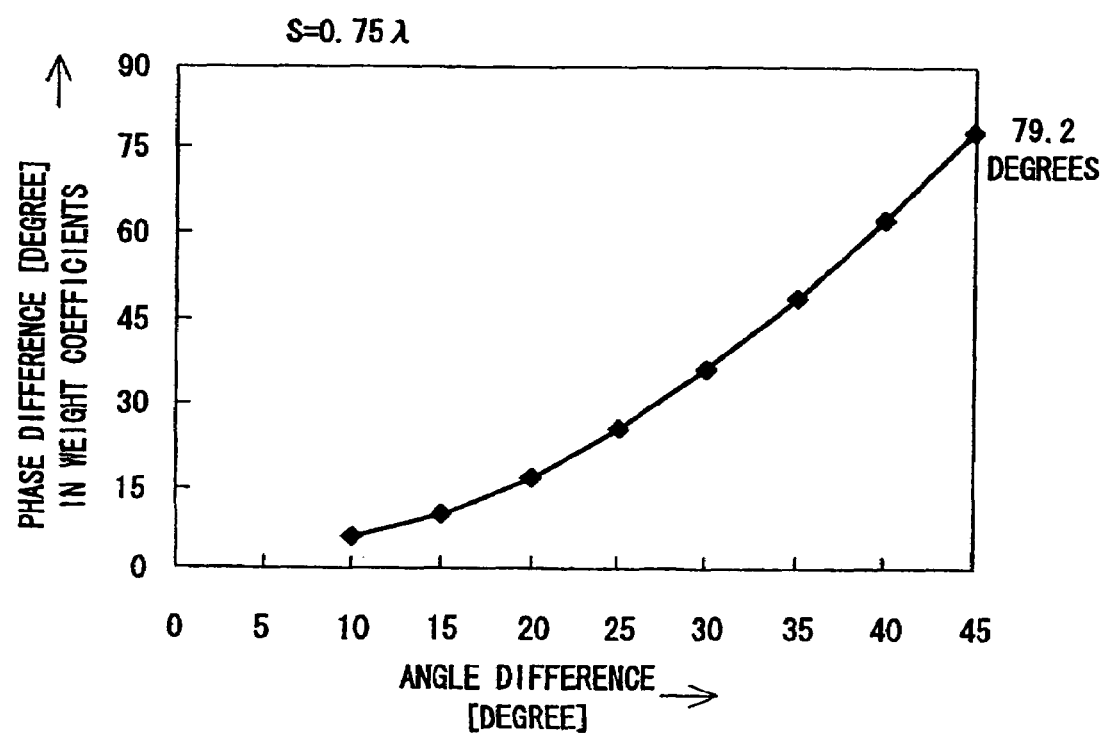
FIG. 11 is a graph showing a phase difference in weight coefficients between the antennas relative to the angle difference between the desired wave and the interference wave when the interval S between the antennas is 0.75 wavelengths in the case of FIG. 2.

FIG. 11 is a graph showing a phase difference in weight coefficient between the antennas relative to the angle difference between the desired wave and the interference wave when the interval S between the antennas is 0.75 wavelengths. As is apparent from FIG. 11, the phase shift amount required for the phase shifters 8a and 8c is 79.2 degrees and can be reduced to about one-fifth of that for the adaptive antenna apparatus constituted by the omni-directional antennas.

Figure 32:
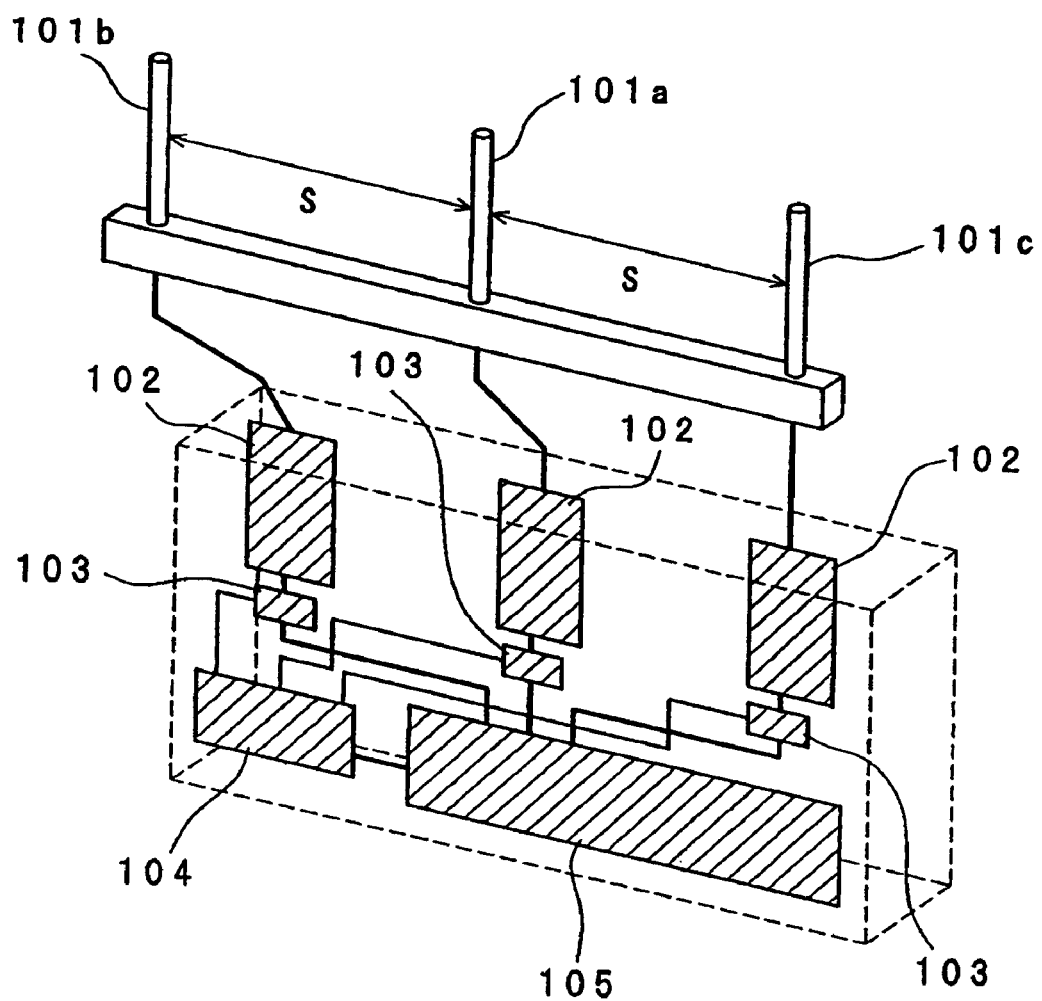
FIG. 32 is a perspective view showing a configuration of a prior art adaptive antenna apparatus.
Figure 33:
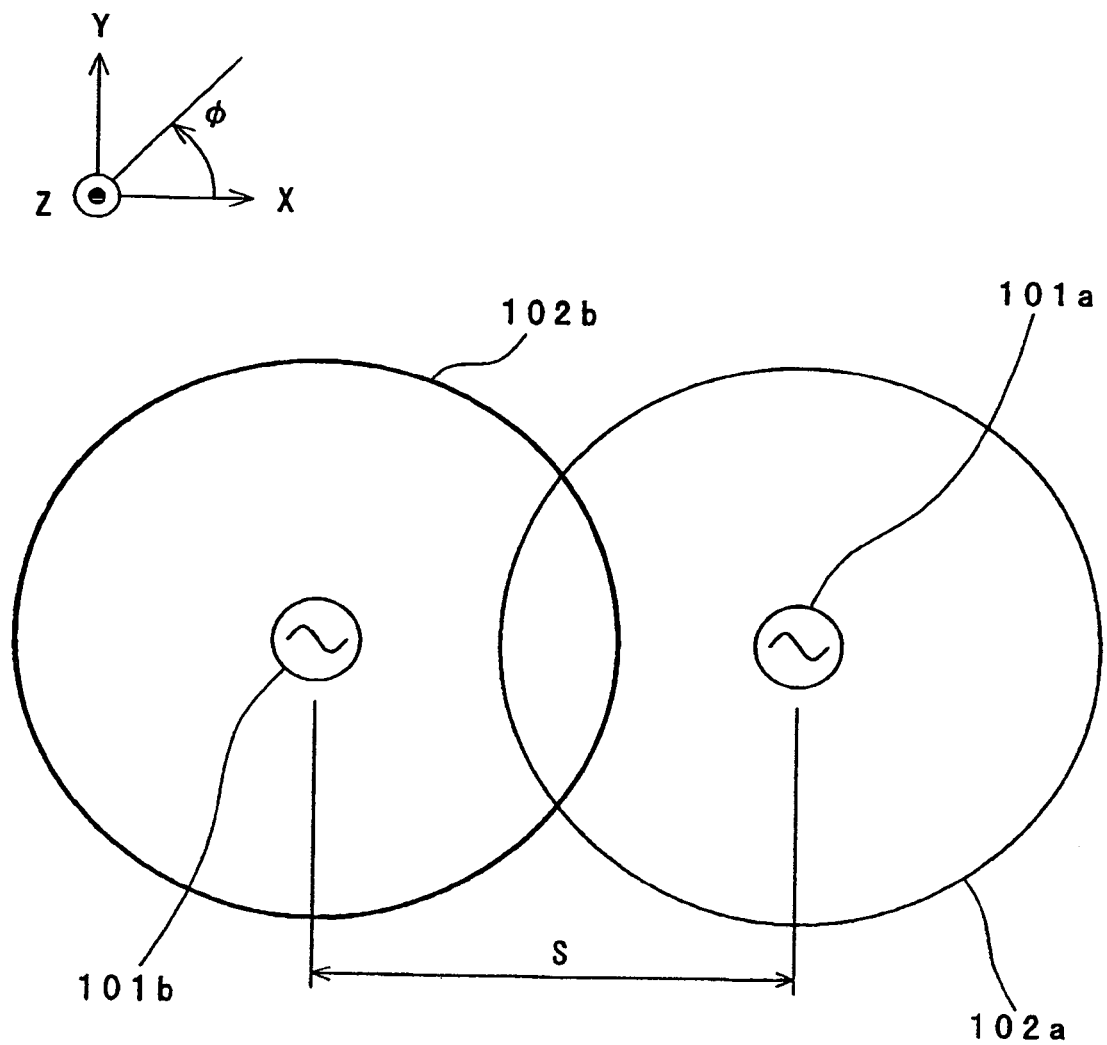
FIG. 33 is a plan view showing a directional characteristic when two antennas 101a and 101c shown in FIG. 32 are employed.
Figure 34:
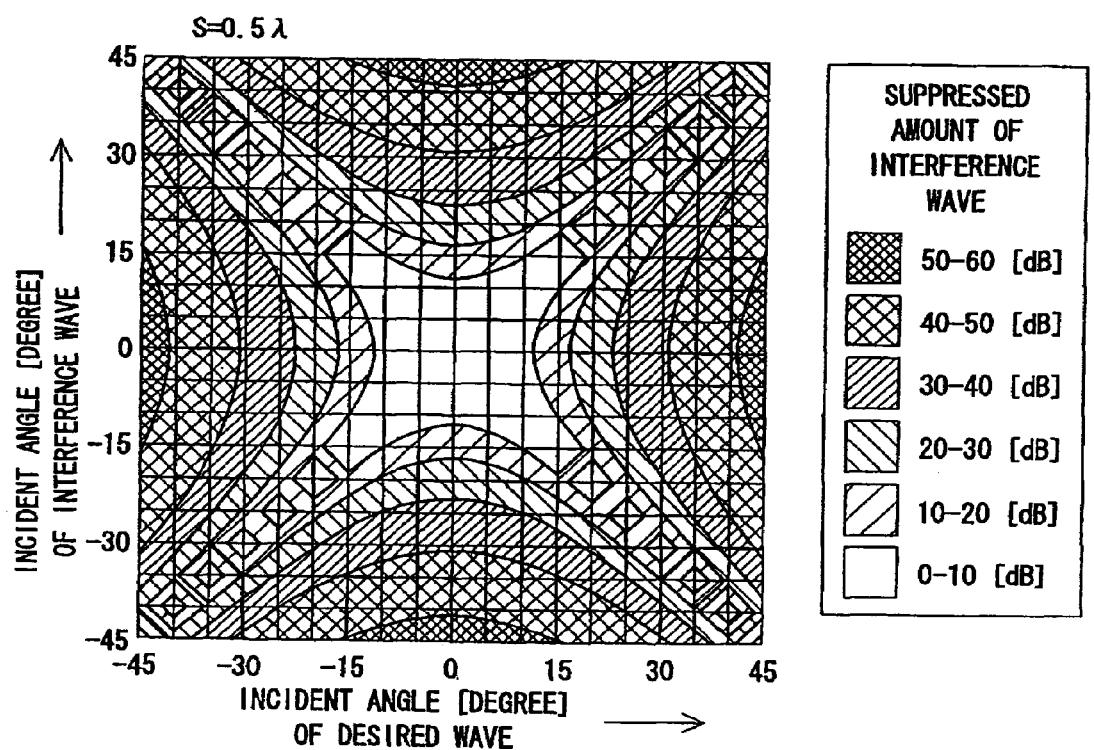
FIG. 34 is a graph showing a suppressed amount of an interference wave by an adaptive control when an incident angle of a desired wave and an incident angle of an interference wave are set in the case of an interval S between the antennas of half the wavelength and the case of FIG. 33.

As described above, in the adaptive antenna apparatus that takes the adaptive control using the paired antennas 1a and 1c each having the bidirectional characteristic, when the interval S between the antennas is set to 0.75 wavelengths, it is possible to not only increase the main beam gain but also obtain the large suppressed amount of the interference wave, as compared with those of the prior art shown in FIG. 32 and the instance of setting the interval S between the antennas at 0.5 or 0.8 wavelengths. Further, as compared with those of the instance of setting the interval S between the antennas at 0.5 wavelengths, the phase shift amount of the phase shifter is slightly increased. However, the phase shift amount is 79.2 degrees, so that the phase shift amount can be realized by one 90-degree phase shifter that is normally easily available. Accordingly, it is more preferable to set the interval S between the antennas at 0.75 wavelengths (=(about ¼ wavelengths)+(½ wavelengths)).

In the present preferred embodiment stated above, the configuration of the adaptive antenna apparatus in which the four antennas 1a, 1b, 1c and 1d are used has been described by way of example. However, the present invention is not limited to this. The adaptive antenna apparatus may be constituted to use six or more, even number of antennas.

Figure 31:
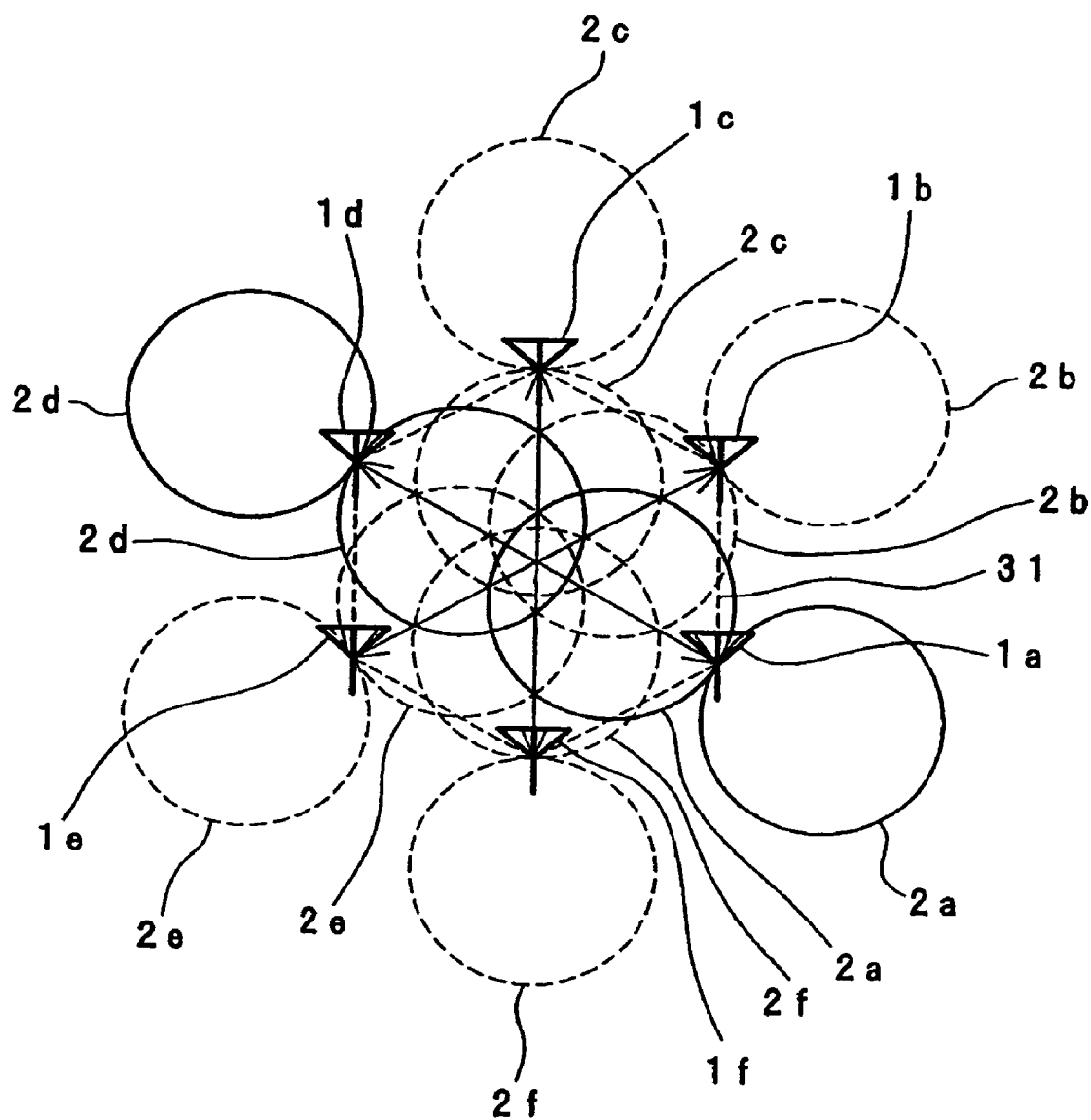
FIG. 31 is a block diagram showing an adaptive control circuit of an adaptive antenna apparatus according to a modified preferred embodiment of the first preferred embodiment of the present invention.

FIG. 31 is a block diagram showing an adaptive control circuit of an adaptive antenna apparatus according to a modified preferred embodiment of the first preferred embodiment of the present invention. The antenna apparatus shown in FIG. 31 is characterized by including six antennas 1a, 1b, 1c, 1d, 1e and 1f each of, for example, half-wavelength dipole antenna, where the antennas 1a, 1b, 1c, 1d, 1e and 1f have bidirectional characteristic radiation patterns 2a, 2b, 2c, 2d, 2e and 2f, respectively, and are provided at vertexes of an equilateral hexagon 31, respectively. In the adaptive antenna apparatus, adaptive control is executed selectively using any one of a first pair of antennas 1a and 1d opposing to each other, a second pair of antennas 1b and 1e opposing to each other, and a third pair of antennas 1c and 1f opposing to each other. In this way, if the number of antennas increases, an area covered by one antenna narrows. This leads to that it is possible to employ bidirectional antennas having a higher gain in a main beam direction parallel to a direction of a desired wave. Accordingly, the gain can be further increased and the suppressed amount of the interference wave can be further increased. Besides, because of the narrow covering area, a phase shift amount of a radio signal input to the antenna to realize the interference wave suppression control is small, so that a phase shifter having a smaller maximum phase shift amount can be employed.

Second Preferred Embodiment

Figure 12:
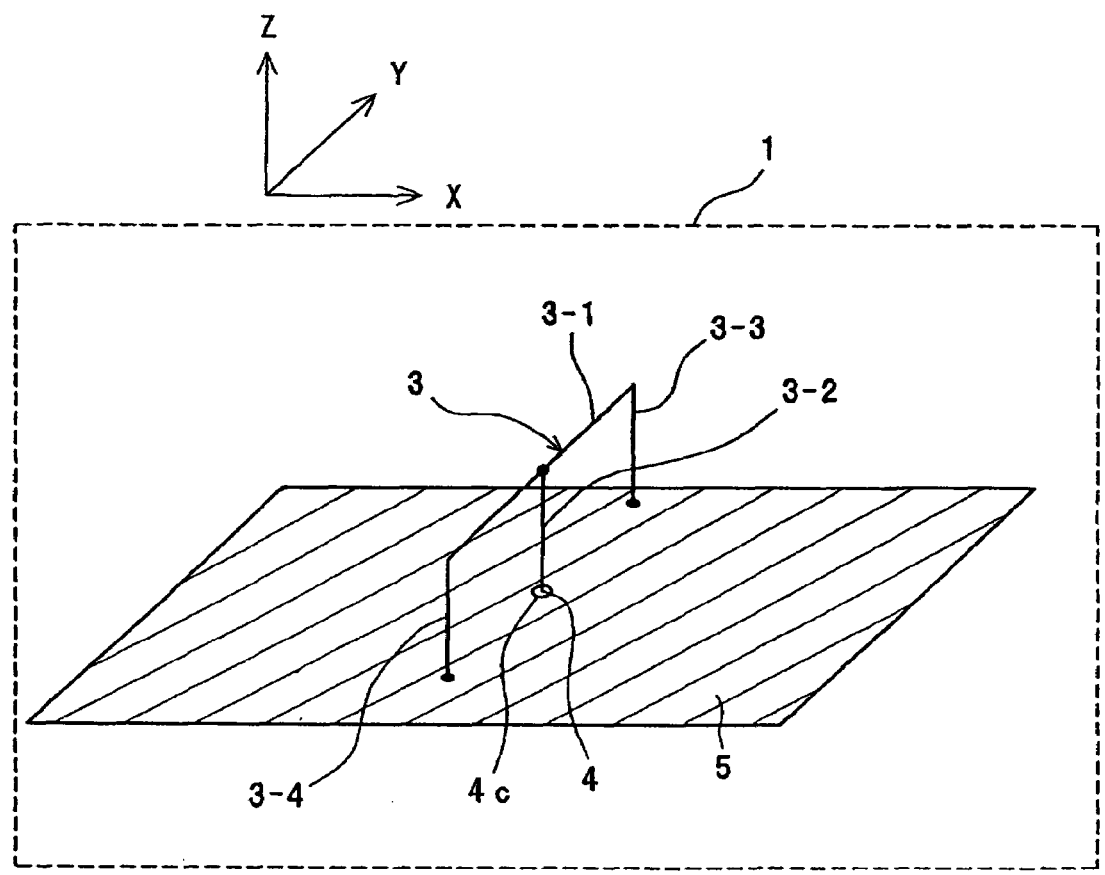
FIG. 12 is a perspective view showing a configuration of an M-type antenna 3 employed in an adaptive antenna apparatus according to a second preferred embodiment of the present invention.

FIG. 12 is a perspective view showing a configuration of an M type antenna 3 employed in an adaptive antenna apparatus according to a second preferred embodiment of the present invention. It is noted that the M type antenna element 3 and the antenna apparatus that employs the element 3 are disclosed in the Japanese Patent Laid-Open Publication No. 2002-359515 and U.S. Pat. No. 6,600,455. The contents as disclosed in these publications are included herein by reference with those. In the first preferred embodiment, the adaptive antenna apparatus is constituted so that the four antennas 1a, 1b, 1c and 1d are arranged in parallel to each other. The second preferred embodiment is characterized by further reducing the size of the adaptive antenna apparatus using the M type antenna element 3 as shown in FIG. 13.

Referring to FIG. 12, the M type antenna element 3 includes a radiation conductor 3-1, a feeding conductor 3-2, two short-circuit conductors 3-3 and 3-4, and a grounding conductor 5. The radiation conductor 3-1 is arranged so as to be parallel to the grounding conductor 5, and both ends of the radiation conductor 3-1 are grounded to the grounding conductor 5 through the short-circuit conductors 3-3 and 3-4, respectively. The feeding conductor 3-2 and the two short-circuit conductors 3-3 and 3-4 are formed to be vertically built at an angle perpendicular to the grounding conductor 5 and to be parallel to each other. In addition, one end of the feeding conductor 3-2 is connected to a central portion of the radiation conductor 3-1, and the other end of the feeding conductor 3-2 is connected to a feeding point 4. At the feeding point 4, a circular hole 4c is formed in the grounding conductor 5, and the feeding conductor 3-2 is passed through the circular hole 4c and connected to a feeding cable such as a coaxial cable when the feeding conductor 3-2 is electrically isolated from the grounding conductor 5.

Figure 13:
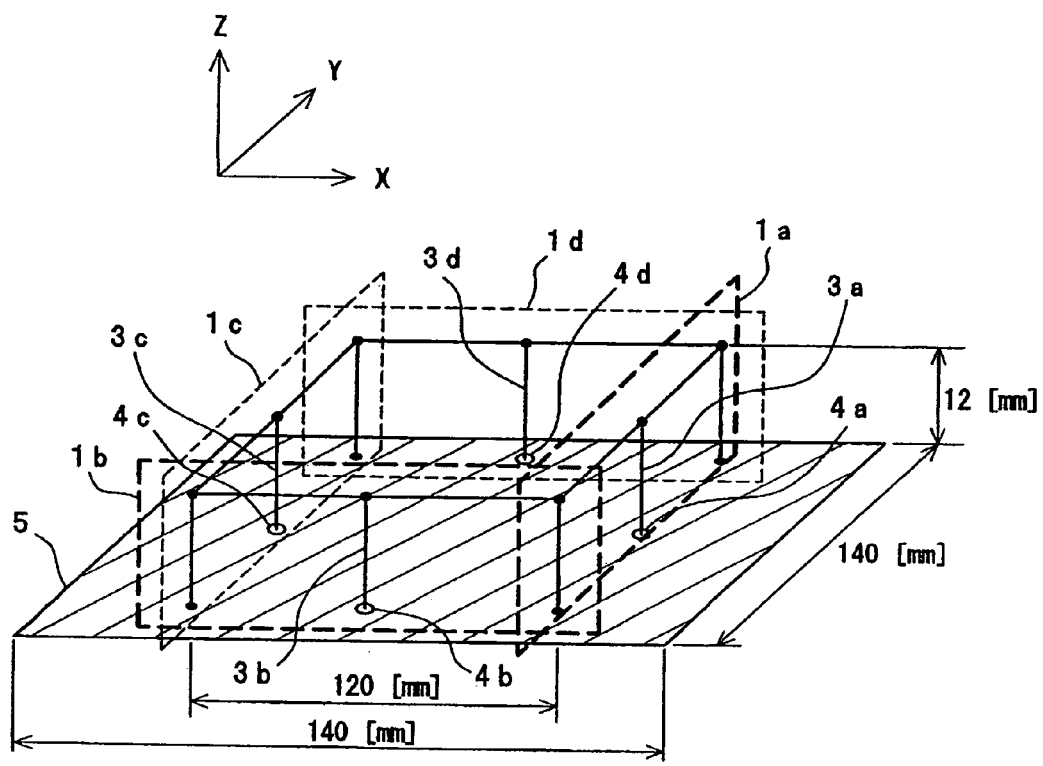
FIG. 13 is a perspective view showing a configuration of the adaptive antenna apparatus that includes four M-type antenna elements 3a, 3b, 3c and 3d shown in FIG. 12.

FIG. 13 is a perspective view showing a configuration of the adaptive antenna apparatus that includes four M type antenna elements 3a, 3b, 3c and 3d shown in FIG. 12.

Referring to FIG. 13, the four M type antenna elements 3a, 3b, 3c and 3d constitute antennas 1a, 1b, 1c and 1d, respectively. The four M type antenna elements 3a, 3b, 3c and 3d include feeding points 4a, 4b, 4c, and 4d, respectively. The adaptive antenna apparatus shown in FIG. 13 is characterized by reducing the size of the antenna apparatus as compared with the antenna apparatus according to the first preferred embodiment by sharing short-circuit conductors of the adjacent M type antenna elements. The radiation conductors 3-1 of the four M type antenna elements 3a, 3b, 3c and 3d form a square. According to a prototype produced by the inventor of the present invention, a length of each of the radiation conductors 3-1 of the four M type antenna elements 3a to 3d is 120 mm, a length of each of the short-circuit conductors 3-3 and 3-4 as serving as a height of the radiation conductor 3-1 is 12 mm, and the grounding conductor 5 has a square shape of 140 mm by 140 mm.

In the adaptive antenna apparatus that employs the four M type antenna elements 3a to 3d, constituted as stated above, the antennas 1a and 1c exhibit a bidirectional characteristic including a higher gain in a main beam direction parallel to ±X-axial direction. In addition, the antennas 1b and 1d exhibit a bidirectional characteristic including a higher gain in a main beam direction parallel to ±Y-axial direction. That is, a pair of antennas 1a and 1c and a pair of antennas 1b and 1d can cover a 360-degree area on a horizontal surface and radiate radio waves of radio signals.

Figure 14:
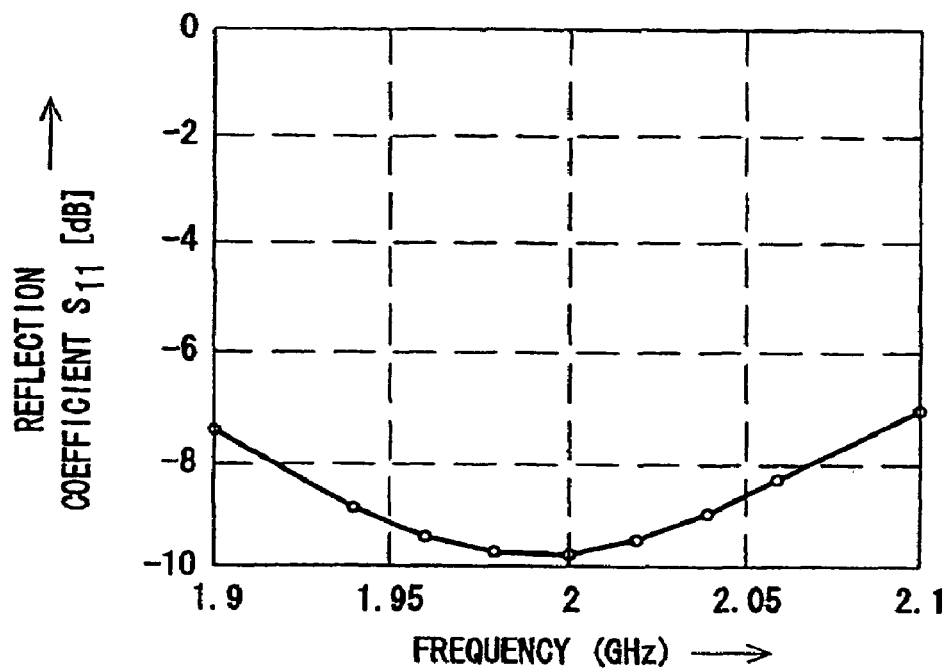
FIG. 14 is a graph showing a frequency characteristic of a reflection coefficient $S_{11}$ of a feeding point when a radio signal is fed to the M type antenna element 3a shown in FIG. 13.

FIG. 14 is a graph showing a frequency characteristic of a reflection coefficient $S_{11}$ of the feeding point when a radio signal is fed to the M type antenna element 3a shown in FIG. 13.

Referring to FIG. 14, the other M type antenna elements 3b, 3c and 3d are each terminated by a terminating resistance of 50 Ω. In the following radiation patterns, all the antennas to which no radio signal is fed are each terminated by a terminating resistance of 50 Ω. As is apparent from FIG. 14, the antenna apparatus has a lowest reflected electric power at a frequency of 2 $GH_z$, and radio waves of radio signals can be transmitted and received with high efficiency. In this case, at the frequency of 2 $GH_z$, a ratio of the reflected electric power to an input electric power is −9.7 dB, and an antenna efficiency is 90%. Each antenna is configured to be symmetric about X and Y axes, and the antennas 1a to 1d are all equal in characteristic to each other, and realize high efficiency antennas, respectively. The length of each of the M type antenna elements 3a to 3d is 120 mm, and a wavelength of the frequency 2 $GH_z$ is 150 nm. Namely, the length of each of the M type antenna elements 3a to 3d is 120/150=0.8 wavelengths. Accordingly, an interval S between each pair of antennas (between the antennas 1a and 1c or between the antennas 1b and 1d) which are provided for adaptive control and which oppose to each other is 0.8 wavelengths, thus realizing a two-element adaptive antenna apparatus that includes bidirectional antennas and that is substantially an optimum model.

Figure 15:
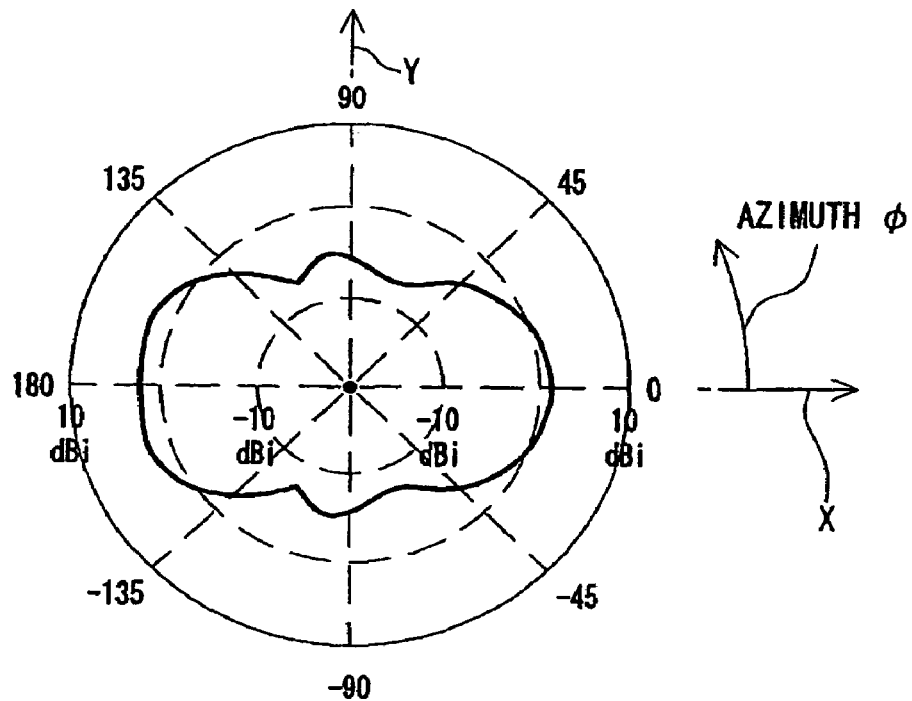

FIG. 15 is a graph showing a radiation directional characteristic of the M type antenna element 3a shown in FIG. 13 on an XY plane when a radio signal is fed to the M type antenna element 3a.

Referring to FIG. 15, a using frequency is 2 $GH_z$, and the following radiation patterns are provided at the using frequency of 2 GHz. As is apparent from FIG. 15, the antenna apparatus exhibits a bidirectional characteristic including a higher gain in a main beam direction parallel to ±X-axial directions. In addition, the antenna apparatus obtains a radiation gain of 3.4 dBi in the −X-axial direction and a radiation gain of 2.0 dBi in the +X-axial direction. As can be seen, the antenna apparatus exhibits the directional characteristic including the slightly higher radiation gain in the −X-axial direction than that in the +X-axial direction. However, a difference in gain between the +X-axial direction and the −X-axial direction is 1.4 dB. The antenna apparatus according to the present preferred embodiment is configured to be symmetric about the X and Y axes, and to include the antennas 1a to 1d all equal in directional characteristic to each other. In this case, the antenna 1b exhibits a bidirectional characteristic that includes a higher gain in the main beam direction parallel to ±Y-axial directions, and that includes a slightly higher gain in the +Y-axial direction than that in the −Y-axial direction. The antenna 1c exhibits a bidirectional characteristic that includes a higher gain in the main beam direction parallel to the ±X-axial directions, and that includes a slightly higher gain in the +X-axial direction than that in the −X-axial direction. The antenna 1d exhibits a bidirectional characteristic that includes a higher gain in the main beam direction parallel to the ±Y-axial directions, and that includes a slightly higher gain in the −Y-axial direction than that in the +Y-axial direction.

The adaptive-controlled radiation characteristic of the adaptive antenna apparatus according to the second preferred embodiment will next be described.

Figure 16:
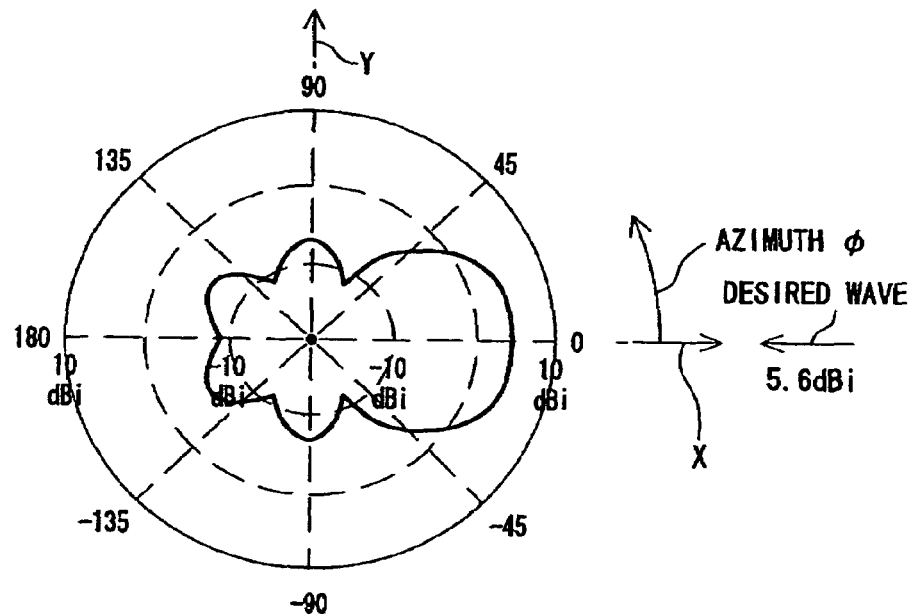
FIG. 16 is a graph showing a radiation directional characteristic on the XY plane when a desired wave arrives in the X-axial direction under the adaptive control in the adaptive antenna apparatus shown in FIG. 13.

FIG. 16 is a graph showing a radiation directional characteristic on the XY plane when not an interference wave but a desired wave arrives in the X-axial direction under the adaptive control in the adaptive antenna apparatus shown in FIG. 13.

As is apparent from FIG. 16, the adaptive antenna apparatus exhibits the directional characteristic that includes a higher gain of 5.6 dBi in the +X-axial direction. This enables obtaining a higher gain by 2.2 dB than a maximum radiation gain of 3.4 dBi exhibited by a single antenna. In addition, gain in the −X-axial direction is −8.6 dBi, which indicates that the directional characteristic in unnecessary directions is suppressed to be small. At that time, a phase of a radio signal radiated from the antenna 1a is +90 degrees ahead of a phase of a radio signal radiated from the antenna 1c. The radio signal radiated from the antenna 1a is set equal in amplitude to the radio signal radiated from the antenna 1c. In this way, the adaptive antenna apparatus according to the second preferred embodiment can obtain the bidirectional characteristic including the higher gain in the main beam direction parallel to the ±X-axial directions that is a direction of the desired wave with no interference wave by adjusting the amplitudes and the phases of the bidirectional antennas opposing to each other, and can obtain an improved sensitivity. In addition, by making the main beam gain in the direction of the desired wave higher, the adaptive antenna apparatus can use a reduced number of antennas.

An example of a radiation characteristic for adaptively controlling the suppression of the interference wave in the adaptive antenna apparatus according to the present preferred embodiment will be described.

Figure 17:
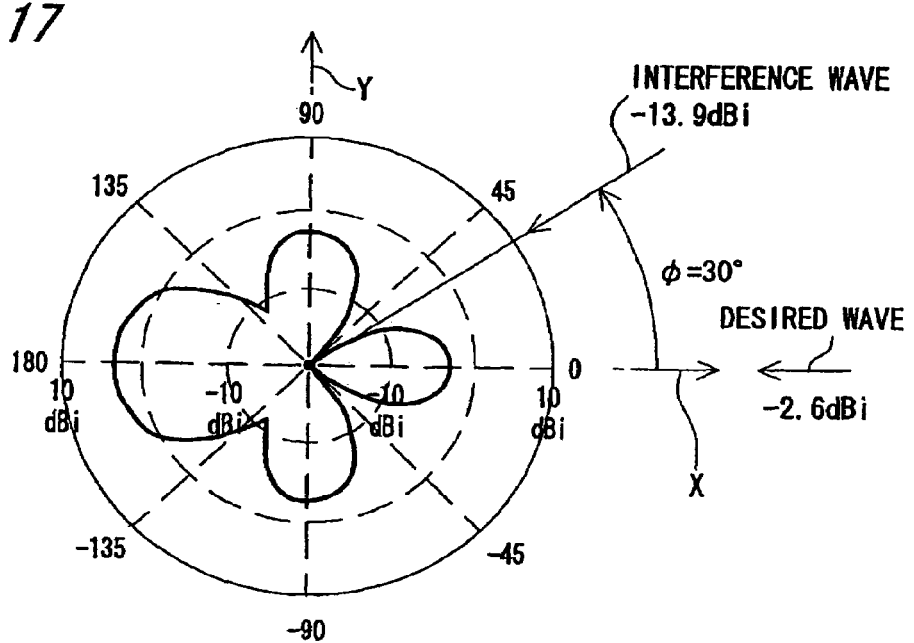
FIG. 17 is a graph showing a radiation directional characteristic on the XY plane when the desired wave arrive from the X-axial direction and the interference wave arrives at an azimuth φ of 30 degrees under the adaptive control of the adaptive antenna apparatus of FIG. 13.

FIG. 17 is a graph showing a radiation directional characteristic on the XY plane when the desired wave arrive from the X-axial direction and the interference wave arrives at an azimuth φ of 30 degrees under the adaptive control of the adaptive antenna apparatus shown in FIG. 13.

As is apparent from FIG. 17, a gain of −2.6 dBi is obtained in the direction of the desired wave and a gain of −13.9 dBi is obtained in the direction of the interference wave, and this leads to that the interference wave suppression effect of 11.3 dB is obtained. At that time, the phase of the radio signal radiated from the antenna 1a is set to zero degree, and that of the radio signal radiated from the antenna 1c is set to 30 degrees. In this way, the adaptive antenna apparatus according to the second preferred embodiment can effectively suppress the interference wave.

As described above, the adaptive antenna apparatus according to the second preferred embodiment can realize the high gain of 5.6 dBi on the horizontal surface with no interference wave, and can realize the adaptive control that enables effectively suppressing the interference wave when the interference wave is present. In the present preferred embodiment, these advantageous effects can be realized although the gains of the directional characteristics of the respective antennas that constitute the adaptive antenna apparatus are different from each other by 1.4 dB. Namely, even if the radiation pattern of each of the antennas is slightly deviated or shifted from the ideal bidirectional characteristic, the advantageous effects of the adaptive antenna apparatus that employs the bidirectional antennas opposing to each other can be obtained.

Moreover, by executing the adaptive control using the paired antennas each having the bidirectional characteristic and opposing to each other, both the high gain and the suppression of the interference wave are realized. By dividing the cover area, the interference wave from outside of the cover area can be suppressed under no adaptive control.

Third Preferred Embodiment

Figure 18:
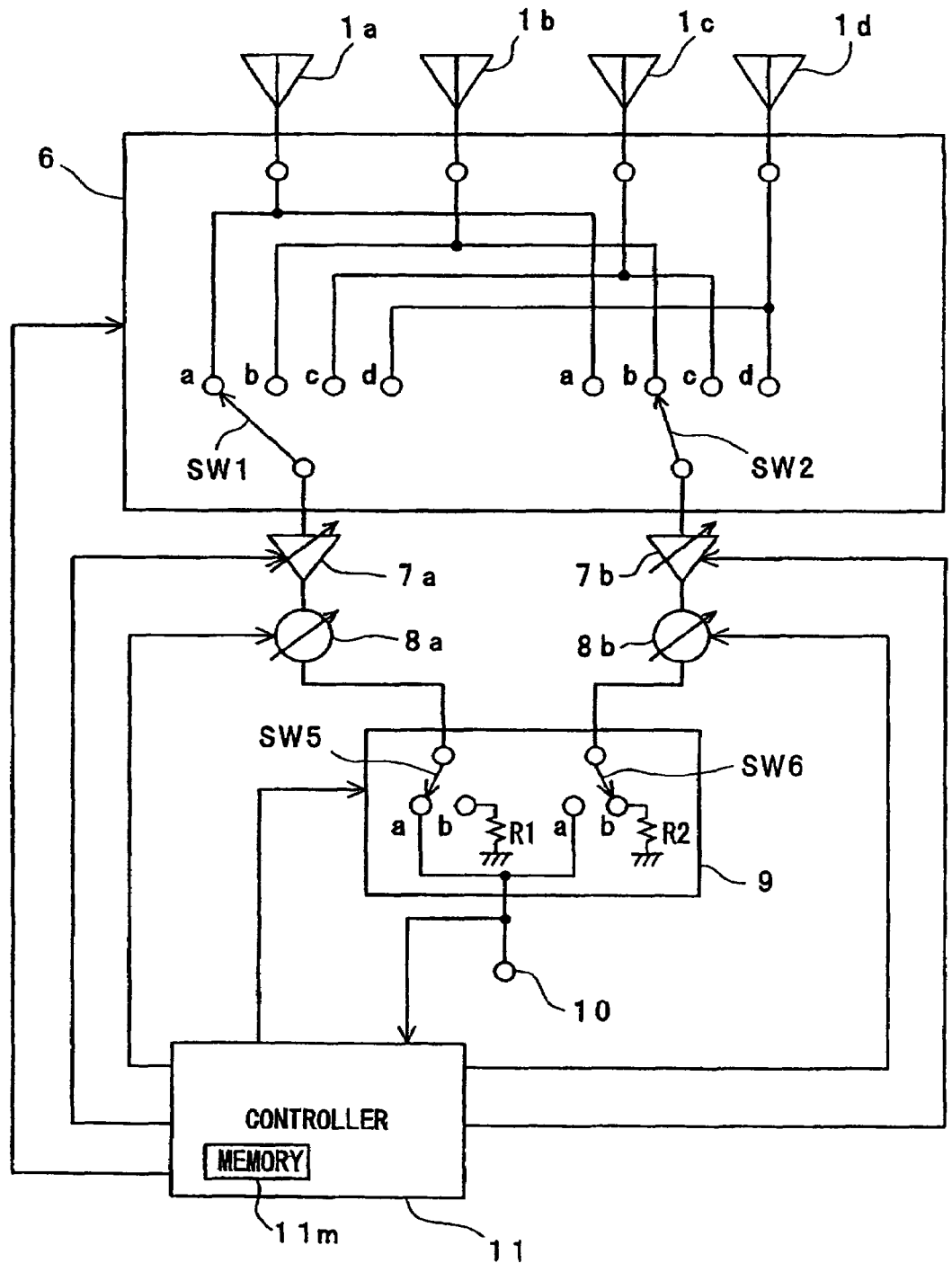
FIG. 18 is a block diagram showing an adaptive control circuit for an adaptive antenna apparatus according to a third preferred embodiment of the present invention.

FIG. 18 is a block diagram showing an adaptive control circuit for an adaptive antenna apparatus according to a third preferred embodiment. The adaptive antenna apparatus according to the third preferred embodiment is characterized by changing amplitudes and phase shift amounts of weight coefficients of variable amplifiers 7a and 7b and phase shifters 8a and 8b connected to a selected pair of antennas by using any one of a first pair of antennas 1a and 1c and a second pair of antennas 1b and 1d, so as to execute adaptive control. It is noted that each of the antennas 1a to 1d is, for example, a half-wavelength dipole antenna and that the antennas 1a to 1d are arranged on the XY plane as shown in FIG. 1.

Referring to FIG. 18, a switch circuit 6 includes two switches SW1 and SW2, and a switch circuit 9 includes two switches SW5 and SW6. The antenna 1a is connected to a contact "a" of the switch SW1 and a contact "a" of the switch SW2, and the antenna 1b is connected to a contact "b" of the switch SW1 and a contact "b" of the switch SW2. The antenna 1c is connected to a contact "c" of the switch SW1 and a contact "c" of the switch SW2, and the antenna 1d is connected to a contact "d" of the switch SW1 and a contact "d" of the switch SW2. The two switches SW1 and SW2 of the switch circuit 6 are controlled by a controller 11, and any one of the first pair of antennas 1a and 1c and the second pair of 1b and 1d are connected to variable amplifiers 7a and 7b and phase shifters 8a and 8b. A common terminal of the switch SW1 is connected to a common terminal of the switch SW5 through the variable amplifier 7a and the phase shifter 8a, and a common terminal of the switch SW2 is connected to a common terminal of the switch SW6 through the variable amplifier 7b and the phase shifter 8b. A contact "a" of the switch SW5 and a contact "a" of the switch SW6 are connected to a signal terminal 10 and the controller 11. The contact "a" of the switch SW5 and the contact "a" of the switch SW6 are grounded through load resistors R1 and R2 having, for example, terminal resistances 50 Ω, respectively. The amplification factors or attenuation factors of the variable amplifiers 7a and 7b are controlled by the controller 11, and the phase shift amounts of the phase shifters 8a and 8b are controlled by the controller 11. Further, the switch circuit 9, which is controlled by the controller 11, outputs a radio signal, which is any one of a radio signal outputted from the phase shifter 8a and a radio signal outputted from the phase shifter 8b or which is obtained by combining these two radio signals, to the controller 11, and also outputs to the signal terminal 10 connected to a radio signal processing circuit (not shown) through a feeding cable (not shown).

Next, the operation for an adaptive control processing (referred to as a first adaptive control processing hereinafter) executed by the adaptive antenna apparatus shown in FIG. 18 will be described with reference to one example in which a radio wave of a radio signal on a desired wave arrives from the +X-axial direction.

(Step S1): Under control of the controller 11, the switch circuit 6 connects any one pair of antennas opposing to each other among the antennas 1a to 1d are connected to the variable amplifiers 7a and 7b, respectively, and connected to the signal terminal 10 through the phase shifters 8a and 8b and the switch circuit 9, respectively. In an initial state, the amplification factors of the variable amplifiers 7a and 7b are each set to one, and the phase shift amounts of the phase shifters 8a and 8b are each set to zero.

(Step S2): In this initial state, the controller 11 controls the switch circuit 6 to connect the paired antennas 1a and 1c to the variable amplifiers 7a and 7b, controls the switch circuit 9 to changes over the switch SW5 of the switch circuit 9 to the contact "a" and the switch SW6 to the contact "b", and controls the phase shifter 8a to connect an output terminal of the phase shifter 8a to the signal terminal 10 and the controller 11 through the switch SW5. At that time, a received electric power Pa of a radio signal outputted from the switch circuit 9 is detected by the controller 11 and temporarily stored in a memory 11m of the controller 11.

(Step S3): The controller 11 controls the switch circuit 9 to switch over the switch SW5 of the switch to the contact "b"

and the switch SW6 to the contact "a", and controls the phase shifter 8a to connect the output terminal of the phase shifter 8a to the signal terminal 10 and the controller 11 through the switch SW6. At that time, a received electric power Pc of the radio signal outputted from the switch circuit 9 is detected by the controller 11 and temporarily stored in the memory 11m of the controller 11.

(Step S4): The controller 11 further controls the switch circuit 6 to connect the paired antennas 1b and 1d to the variable amplifiers 7a and 7b, controls the switch circuit 9 to switch over the switch SW5 to the contact "a" and the switch SW6 to the contact "b", and controls the phase shifter 8a to connect the output terminal of the phase shifter 8a to the signal terminal 10 and the controller 11 through the switch SW5. At that time, a received electric power Pb of the radio signal outputted from the switch circuit 9 is detected by the controller 11 and temporarily stored in the memory 11m of the controller 11.

(Step S5): The controller 11 controls the switch circuit 9 to switch over the switch SW5 to the contact "b" and the switch SW6 to the contact "a", and controls the phase shifter 8a to connect the output terminal of the phase shifter 8a to the signal terminal 10 and the controller 11 through the switch SW6. At that time, a received electric power Pd of the radio signal outputted from the switch circuit 9 is detected by the controller 11 and temporarily stored in the memory 11m of the controller 11.

(Step S6): Next, the received electric powers Pa, Pb, Pc and Pd stored in the memory 11m of the controller 11 are compared and the highest received electric power is selected. In this case, since the desired radio wave of the radio signal arrives from the +X-axial direction, the antennas 1a and 1c receive the radio waves of the radio signals having the highest electric powers. Then the received electric powers Pa and Pc are selected. However, it is noted that any one of the received electric powers Pa and Pc is selected since the radiation patterns of the antennas 1a and 1c are slightly different from each other in a manner similar to that of the case of the prototype according to the second preferred embodiment.

(Step S7): When the received electric power Pa is selected, the controller 11 controls the switch circuit 6 to connect the paired antennas 1a and 1c to the variable amplifiers 7a and 7b, respectively. In addition, the controller 11 controls the switch circuit 9 to switch over the switch SW5 to the contact "a" and the switch SW6 to the contact "b", and controls the phase shifters 8a and 8b to connect the output terminal of the phase shifter 8a and an output terminal of the phase shifter 8b to the signal terminal 10 and the controller 11 through the switches SW5 and SW6, respectively. The controller 11 then adaptively controls the variable amplifiers 7a and 7b and the phase shifters 8a and 8b. Namely, the controller 11 adaptively controls the variable amplifiers 7a and 7b and the phase shifters 8a and 8b so as to control the amplification factors or attenuation factors of the variable amplifiers 7a and 7b and the phase shift amounts of the phase shifters 8a and 8b to increase the radio signal on the desired wave and to reduce the radio signal on the interference wave. With no interference wave, the controller 11 adaptively controls the variable amplifiers 7a and 7b and the phase shifters 8a and 8b to maximize the radio signal on the desired wave.

As described above, the controller 11 includes the memory 11m that stores the received electric powers Pa to Pd related to the radio signals received by the respective antennas 1a, 1b, 1c and 1d, a calculation processing section that calculates the amplification factors or attenuation factors of the variable amplifiers 7a and 7b and the phase shift amounts of the phase shifters 8a and 8b for the adaptive control, and a control section that controls the switch circuits 6 and 9, the variable amplifiers 7a and 7b and the phase shifters 8a and 8b. With such a configuration, it is possible to select an appropriate antenna as the received antenna and increase the gain of the antenna for the radio signal on the desired wave under the adaptive control while preventing degradation of a signal quality by the radio signal on the interference wave.

In the above-stated first adaptive control processing, the adaptive control is taken based on the received electric powers of the radio signals from the respective antennas or the combined received electric power of the radio signal from one paired antennas. However, the present invention is not limited to this. Each radio signal may be demodulated so as to be converted into a baseband signal, and the adaptive control may be taken based on error rates of the demodulated baseband signals.

A second adaptive control processing different from the first adaptive control processing will next be described.

(Step S11): The controller 11 controls the switch circuit 6 to connect the paired antennas 1a and 1c to the variable amplifiers 7a and 7b, respectively, controls the switch circuit 9 to switch over the switch SW5 of the switch 9 to the contact "a" and the switch SW6 to the contact "b", and controls the phase shifters 8a and 8b to connect the output terminals of the phase shifters 8a and 8b to the signal terminal 10 and the controller 11 through the switches SW5 and SW6, respectively. At that time, a combined received electric power Pp of the radio signal outputted from the switch circuit 9 is detected by the controller 11 and temporarily stored in the memory 11m of the controller 11.

(Step S12): The controller 11 controls the switch circuit 6 to connect the paired antennas 1b and 1d to the variable amplifiers 7a and 7b, respectively, controls the switch circuit 9 to switch over the switch SW5 of the switch 9 to the contact "a" and the switch SW6 to the contact "b", and controls the phase shifters 8a and 8b to connect the output terminals of the phase shifters 8a and 8b to the signal terminal 10 and the controller 11 through the switches SW5 and SW6, respectively. At that time, a combined received electric power Pq of the radio signal outputted from the switch circuit 9 is detected by the controller 11 and temporarily stored in the memory 11m of the controller 11.

(Step S13): The paired antenna that detects the higher combined received electric power out of the stored combined received electric powers Pp and Pq is selected. The switch control processing at the step S11 or S12 is executed so as to cause the selected paired antennas to operate. Thereafter, the controller 11 adaptively controls the variable amplifiers 7a and 7b and the phase shifters 8a and 8b. Namely, the controller 11 adaptively controls the variable amplifiers 7a and 7b and the phase shifters 8a and 8b so as to control the amplification factors or attenuation factors of the variable amplifiers 7a and 7b and the phase shift amounts of the phase shifters 8a and 8b to increase the radio signal on the desired wave and to reduce the radio signal on the interference wave. With no interference wave, the controller 11 adaptively controls the variable amplifiers 7a and 7b and the phase shifters 8a and 8b to maximize the radio signal on the desired wave.

In the above-stated second adaptive control processing, the adaptive control is taken based on the combined received electric power of the radio signal from one paired antenna. However, the present invention is not limited to this. Each radio signal may be demodulated so as to be converted into a baseband signal, and the adaptive control may be taken based on error rates of the demodulated baseband signals.

Furthermore, specific calculation methods for the amplification factors and the phase shift amounts applied to the variable amplifiers 7a and 7b, and to the phase shifters 8a and 8b will be described in detail. If a calculated value of a weight coefficient w(t, N) (where N is the number of times of repetitive calculation) as calculated using the above Equation (3) is assumed as $W_{opt}$, the $W_{opt}$ is represented by the following Equation (5). It is assumed herein that the antenna 1a is a first antenna and that the antenna 1b is a second antenna:

$$W_{opt} = [w_{opt1}\ w_{opt2}]^T \tag{5}$$

In the Equation (5), $[\cdot]^T$ denotes an inverted matrix. A conjugate complex is obtained for each element in a right member of the Equation (5), the radio signal radiated from the antenna 1a is amplified by the weight coefficient $w_{opt1}^*$, and the radio signal radiated from the antenna 1c is amplified by the weight coefficient $w_{opt2}^*$. The amplitudes of the weight coefficients $w_{opt1}^*$ and $w_{opt2}^*$ are represented by the following Equations (6) and (7), respectively:

$$A_1 = |w_{opt1}^*| \tag{6}$$

$$A_2 = |w_{opt2}^*| \tag{7}$$

Further, the phases $\theta_1$ and $\theta_2$ of the weight coefficients $w_{opt1}^*$ and $w_{opt2}^*$ are represented by the following Equations (8) and (9), respectively:

$$\tan(\theta_1) = Im(w_{opt1})/Re(w_{opt1}) \tag{8}$$

$$\tan(\theta_2) = Im(w_{opt2})/Re(w_{opt2}) \tag{9}$$

Accordingly, the following Equations (10) and (11) can be obtained:

$$\theta_1 = \tan^{-1}(Im(w_{opt1}^*)/Re(w_{opt1}^*)) \tag{10}$$

$$\theta_2 = \tan^{-1}(Im(w_{opt2}^*)/Re(w_{opt2}^*)) \tag{11}$$

In the equations, $Im(\cdot)$ denotes an imaginary component of the complex number of each factor, and $Re(\cdot)$ denotes a real component of the factor. The weight coefficient can be thus calculated.

In the above-stated preferred embodiment, the amplitude and phase of the weight coefficient are adaptively controlled. However, the present invention is not limited to this. At least one of the amplitude and the phase of the weight coefficient may be adjusted and controlled.

In the above-stated preferred embodiment, the two variable amplifiers 7a and 7b and the two phase shifters 8a and 8b are employed to adaptively control the paired antennas opposing to each other. However, the present invention is not limited to this. One variable amplifier and one phase shifter may be selectively switched and employed by the switch. Then a cost reduction can be realized. In addition, the variable amplifier and the phase shifter may be connected to the subsequent stage right after each of the antennas 1a, 1b, 1c and 1d. By thus constituting the same apparatus, the variable amplifiers and the shift registers as many as the antennas are necessary. However, this can easily perform the calibration that enables adjusting the phases and the amplitudes of the radio signals received by the respective antennas.

If the adaptive control is taken using one paired antennas, it is necessary to change a total of four parameters of the amplitudes $A_1$ and $A_2$ and the phases $\theta_1$ and $\theta_2$ as the weight coefficients. However, by using a ratio of these amplitudes and a phase difference as parameters, the number of parameters to be changed can be reduced to two as shown in the following Equations (12) and (13):

$$A_{21} = A_2/A_1 \tag{12}$$

$$\theta_{21} = \theta_2/\theta_1 \tag{13}$$

In this case, the amplitude and the phase of the antenna 1a of the first antenna are not changed (that is, the amplitude is fixed to one and the phase is fixed to zero). The amplitude and the phase of the antenna 1c as serving as the second antenna are changed (that is, the amplitude is set to $A_{21}$ and the phase is set to $\theta_{21}$). Then, the same functions and advantages as those of the adaptive control based on the Equations (5) to (11) can be attained.

Fourth Preferred Embodiment

Figure 19:
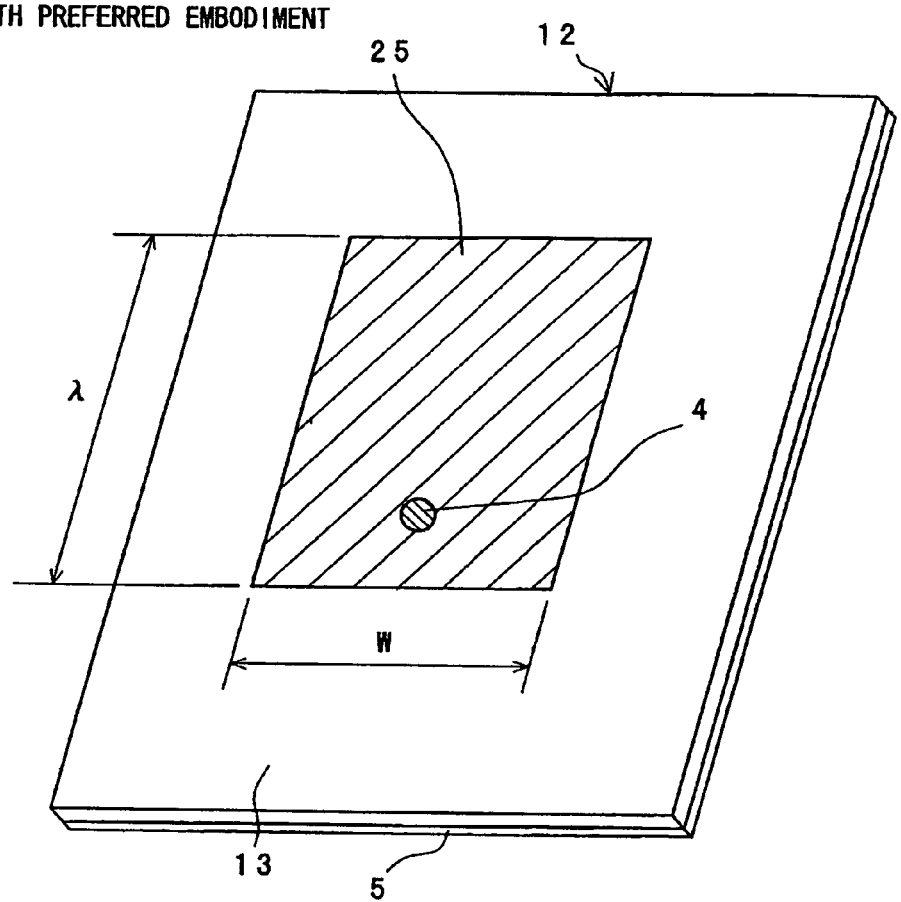
FIG. 19 is a perspective view showing a configuration of a patch antenna apparatus according to a fourth preferred embodiment of the present invention.
Figure 20:
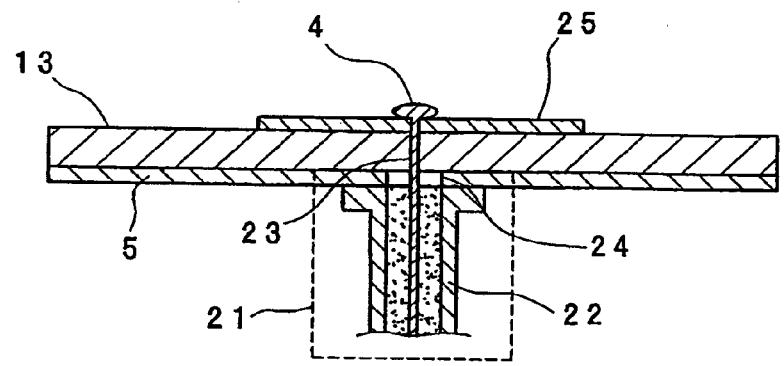
FIG. 20 is a longitudinal sectional view taken along a plane A-A' of FIG. 19.
Figure 21:
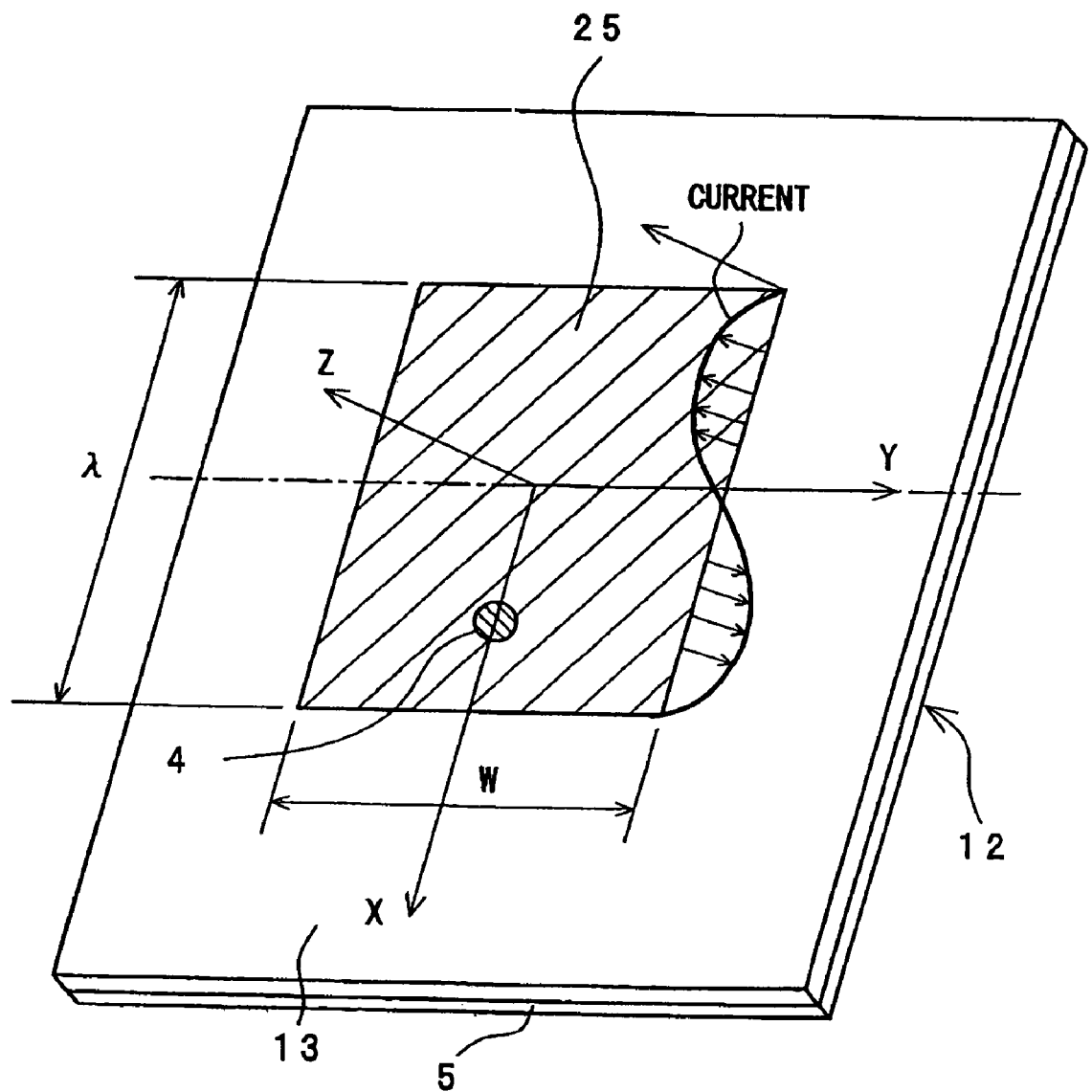
FIG. 21 is a perspective view showing an operation executed by the patch antenna apparatus shown in FIG. 19.

FIG. 19 is a perspective view showing a configuration of a patch antenna apparatus according to a fourth preferred embodiment of the present invention. FIG. 20 is a longitudinal sectional view taken along a plane A-A' of FIG. 19. FIG. 21 is a perspective view showing an operation executed by the patch antenna apparatus shown in FIG. 19. The patch antenna apparatus is another example of the antenna having the bidirectional characteristic.

Referring to FIGS. 19 and 20, a rectangular patch conductor 25 having a width W and a length λ is formed in a central portion of a top surface of a dielectric substrate 13 having a grounding conductor 5 formed on a bottom surface thereof. A point in the vicinity of the side of a lower end relative to a central portion in the width direction of the patch conductor 25 and the central portion in a length direction of the patch conductor 25 is defined as a feeding point 4. A radio signal is fed to the feeding point 4 by a coaxial cable 21 which is constituted by a central conductor 23 and a grounding conductor 22. The central conductor 23 is electrically isolated from the grounding conductor 5 by a gap 24.

If the one-wavelength patch antenna apparatus as constituted as stated above is allowed to operate as a reception antenna, then a current of a received radio signal flows in a direction parallel to the side having a length of one wavelength of the patch conductor 25. At a resonance frequency, a standing wave is generated so as to make the current null at both ends of the patch conductor 25 as shown in FIG. 21.

Referring to FIG. 21, a current distribution is shown along the side at the right side end of the patch conductor 25 for easy understanding, i.e., the current is uniformly distributed in the width W direction of the patch conductor 25. In this way, a positive current and a negative current flow on the patch conductor 25. Accordingly, the radio waves of the radio signals on a ZY plane including a center line (Y-axis) and included in the patch antenna apparatus are cancelled each other and are not radiated. Namely, with the configuration shown in FIG. 21, the bidirectional characteristic having the radio signals intensified in the ±X-axial directions is obtained. It is preferable that the width W is set to be equal to or smaller than half the wavelength so as not to cause a resonance in the Y-axial direction.

By employing the one-wavelength patch antenna apparatus according to the present preferred embodiment, the antenna apparatus can be made extremely thinner. In a band of, for example, 2 $GH_z$ band, a high efficiency antenna can be realized and a thin substrate can be employed by using the dielectric substrate 13 having a thickness of 3 mm. This leads to that it is possible to make the antenna thinner, and realize the superior antenna which can not be easily seen by any person.

In the above-stated preferred embodiment, the coaxial cable 21 is used. However, the present invention is not limited to this. A microstrip line formed on the same substrate as that of the patch antenna may be used as a feeding line.

Fifth Preferred Embodiment

Figure 22:
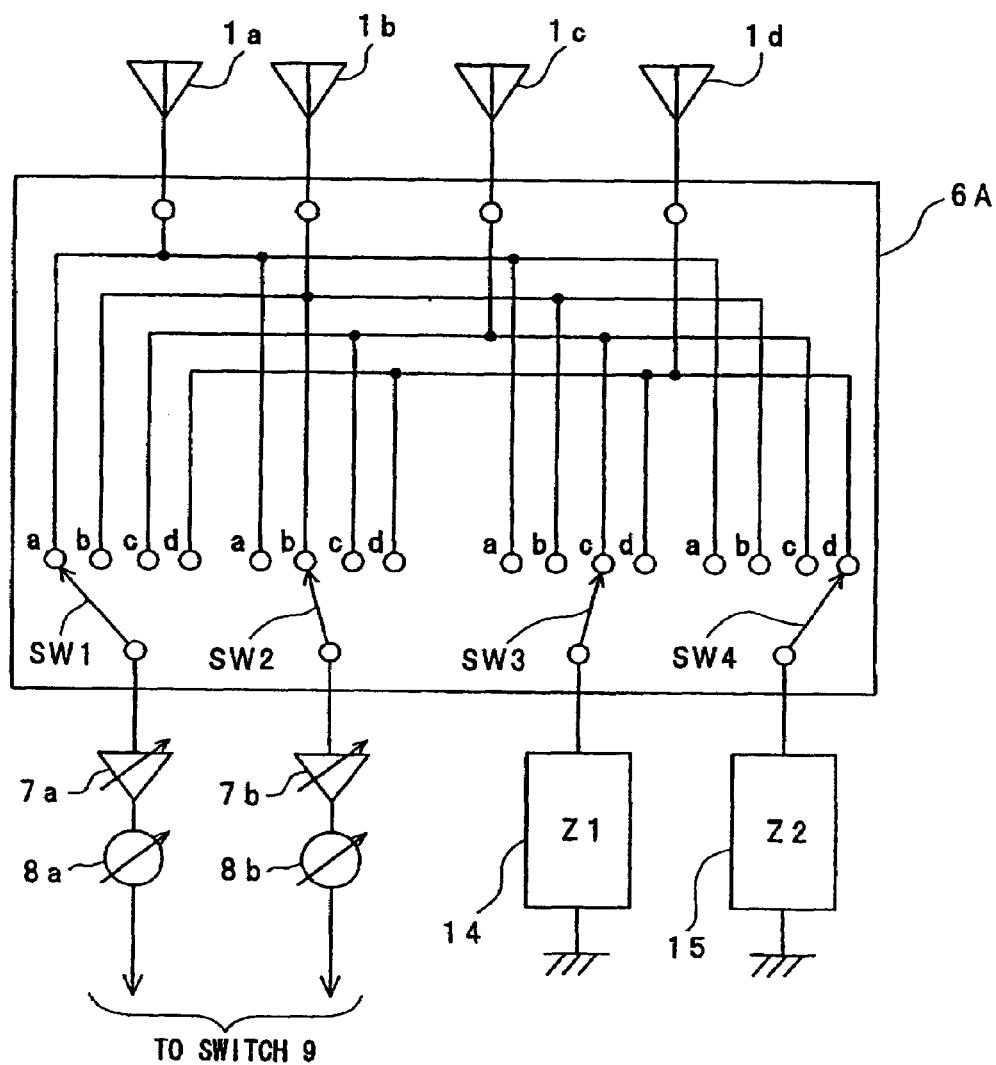
FIG. 22 is a block diagram showing an adaptive control circuit for an adaptive antenna apparatus according to a fifth preferred embodiment of the present invention.

FIG. 22 is a block diagram showing an adaptive control circuit for an adaptive antenna apparatus according to a fifth preferred embodiment of the present invention. In the third preferred embodiment shown in FIG. 18, the unused antennas are connected to the load resistors R1 and R2 having, for example, the terminating resistances of 50 Ω. The fifth preferred embodiment is characterized, as shown in FIG. 22, by connecting unused antennas to load impedances 14 and 15 having different impedances Z1 and Z2, respectively. The impedances Z1 and Z2 may be equal to each other.

In the adaptive antenna apparatus constituted as stated above, when a pair of antennas 1a and 1c are selected by a switch circuit 6 and the antennas 1a and 1c are connected to variable amplifiers 7a and 7b, respectively, under control of a controller 11, antennas 1b and 1d are connected to the load impedances 14 and 15 by the switch circuit 6, respectively. Conversely, when a pair of antennas 1b and 1d are selected by the switch circuit 6, the antennas 1b and 1d are connected to the variable amplifiers 7a and 7b, respectively. In addition, the antennas 1a and 1c are connected to the impedances 14 and 15 by the switch circuit 6, respectively. The two load impedances 14 and 15 can further control a directional characteristic of the adaptive antenna apparatus.

Figure 23:
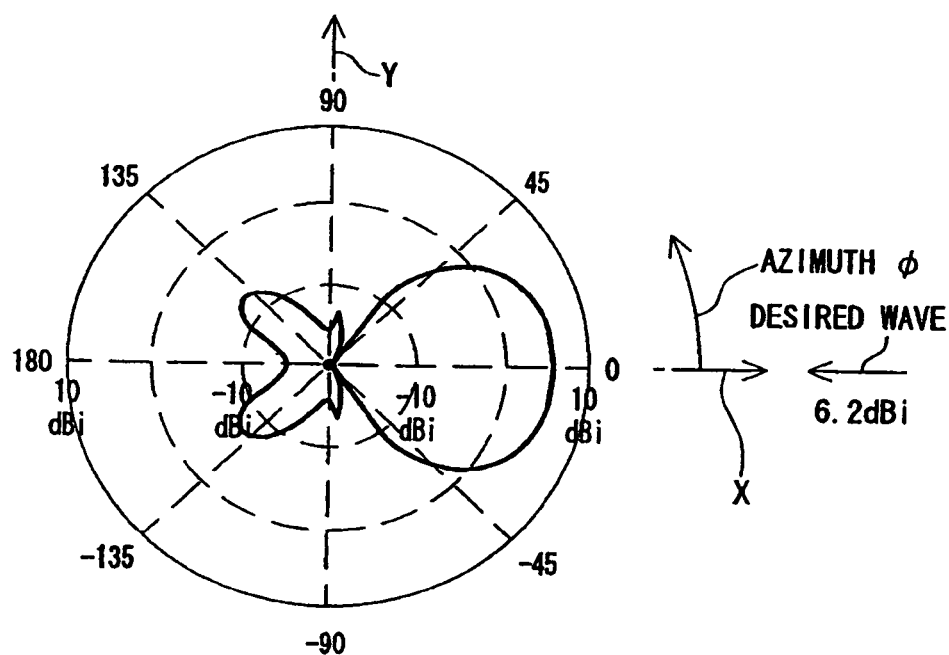
FIG. 23 is a graph showing a radiation directional characteristic of the adaptive antenna apparatus shown in FIG. 22 on an XY plane when a desired wave arrives from an X-axial direction.

FIG. 23 is a graph showing a radiation directional characteristic of the adaptive antenna apparatus shown in FIG. 22 on an XY plane when a desired wave arrives from an X-axial direction.

Figure 24:
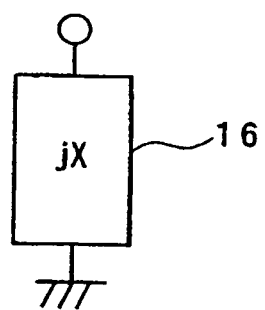
FIG. 24 is a circuit diagram showing that load impedances 14 and 15 in the adaptive antenna apparatus shown in FIG. 22 are each constituted by a reactance 16.

FIG. 23 shows a radiation pattern on the XY plane when the load impedances 14 and 15 each containing a reactance component of j1000 Ω are connected to the antennas 1b and 1d if the antennas 1a and 1c receive a radio signal having the same amplitude so that the radio signal is fed having a phase of 90 degrees ahead of the radio signal received by the antenna 1c. As is apparent from FIG. 23, the adaptive antenna apparatus shown in FIG. 22 can suppress a radiated electric power in a −X-axial direction and obtain a high gain of 6.2 dBi in a +X-axial direction. The gain of the adaptive antenna apparatus shown in FIG. 22 increases by 0.6 dB from the gain of the adaptive antenna apparatus according to the third preferred embodiment shown in FIG. 18 when the antennas 1b and 1d are terminated by the load resistors R1 and R2 having the terminating resistances of 50 Ω. In this case, since each load impedance is constituted only by a reactance 16 as shown in FIG. 24, the electric power consumed by the load impedances 14 and 15 becomes zero. In other words, the electric powers of the radio signals received by the paired antennas 1b and 1d are reflected by the load impedances 14 and 16 as serving as the reactances 16, and radio waves of the radio signals are radiated again from the antennas 1b and 1d, whereby a high efficiency antenna can be realized.

Sixth Preferred Embodiment

Figure 25:
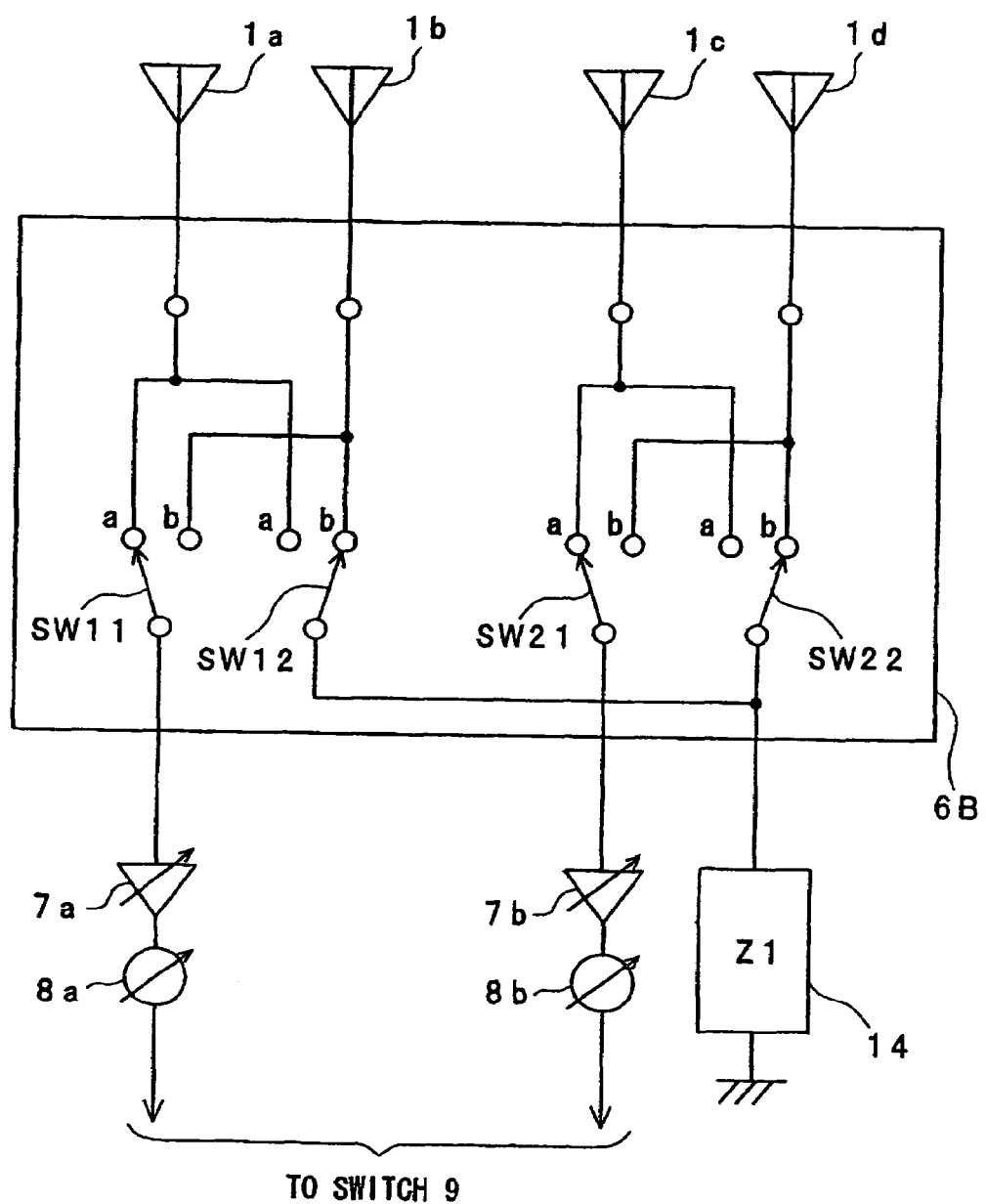
FIG. 25 is a block diagram of an adaptive control circuit for an adaptive antenna apparatus according to a sixth preferred embodiment of the present invention.

FIG. 25 is a block diagram of an adaptive control circuit for an adaptive antenna apparatus according to a sixth preferred embodiment of the present invention. This sixth preferred embodiment is characterized, as compared with the fifth preferred embodiment, by using only one load impedance 14. Namely, referring to FIG. 22, when the impedances Z1 and Z2 are equal to each other, the load impedance may be constituted as shown in FIG. 25.

Referring to FIG. 25, the fourth preferred embodiment is characterized by connecting unused antennas to the load impedance 14 having the impedance Z1 using a switch circuit 6B that includes switches SW11, SW12, SW21, and SW22.

Since the present preferred embodiment can reduce the number of components, it is then possible to reduce a cost and reduce a size of the antenna apparatus.

In the above-stated fifth and sixth preferred embodiments, when the load impedances 14 and 15 are constituted only by reactances, respectively, the load impedances 14 and 15 may be constituted by variable capacitance diodes and capacitances of the variable capacitance diodes may be changed so as to obtain a desired directional characteristic by changing a direct-current bias voltage applied to each element. Further, the load impedances 14 and 15 may be constituted by grounding one end of its element using a chip resistor, a coil, or a capacitor. In this case, a size of a circuit can be reduced. Besides, when each load impedances contains only a reactance component, the load impedances 14 and 15 may be constituted by short-circuiting or opening one end of a high frequency transmission line such as a microstrip line, a coaxial cable or the like. In this case, an ideal load impedance with a lower loss can be realized.

Seventh Preferred Embodiment

Figure 26:
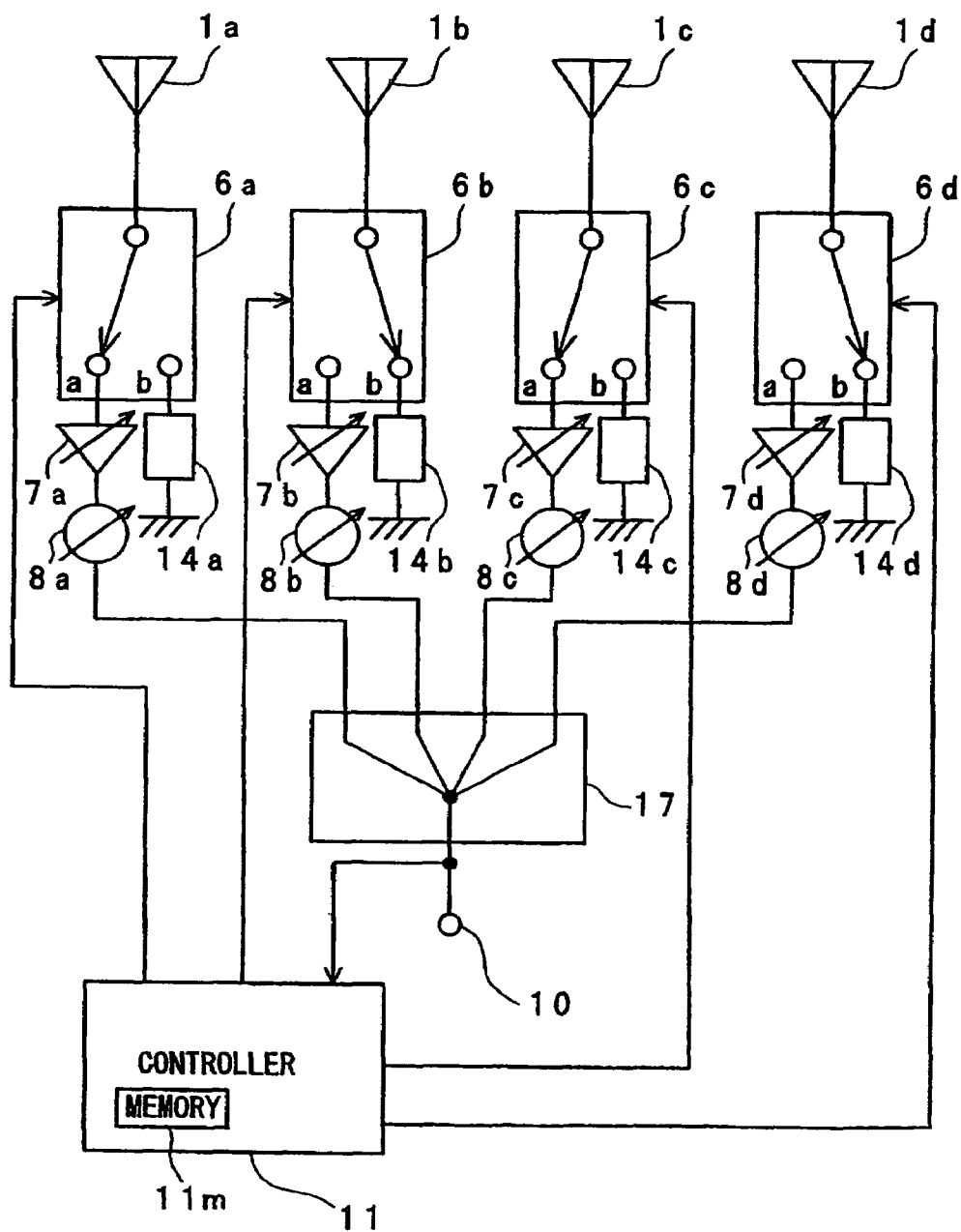
FIG. 26 is a block diagram showing an adaptive control circuit for an adaptive antenna apparatus according to a seventh preferred embodiment of the present invention.

FIG. 26 is a block diagram showing an adaptive control circuit for an adaptive antenna apparatus according to a seventh preferred embodiment of the present invention. The seventh preferred embodiment is a modified preferred embodiment of the third preferred embodiment shown in FIG. 18 and is characterized by being constituted as follows.

Referring to FIG. 26, an antenna 1a is connected to a variable amplifier 7a and a phase shifter 8a or to a load impedance 14a through a switch 6a, and an antenna 1b is connected to a variable amplifier 7b and a phase shifter 8b or to a load impedance 14b through a switch 6b. In addition, an antenna 1c is connected to a variable amplifier 7c and a phase shifter 8c or to a load impedance 14c through a switch 6c, and an antenna 1d is connected to a variable amplifier 7d and a phase shifter 8d or to a load impedance 14d through a switch 6d. The radio signals from the phase shifters 8a to 8d are combined by a distributor and combiner 17 and the combined radio signal is output to a controller 11 and a signal terminal 10.

The adaptive antenna apparatus constituted as stated above can employ the distributor and combiner 17 in place of the switch circuit 9, so that the adaptive antenna apparatus can be constituted using one-to-two switches 14a to 14d and the distributor and combiner 17 which are normally easily available and inexpensive because they are general-purpose parts or products.

Eighth Preferred Embodiment

Figure 27:
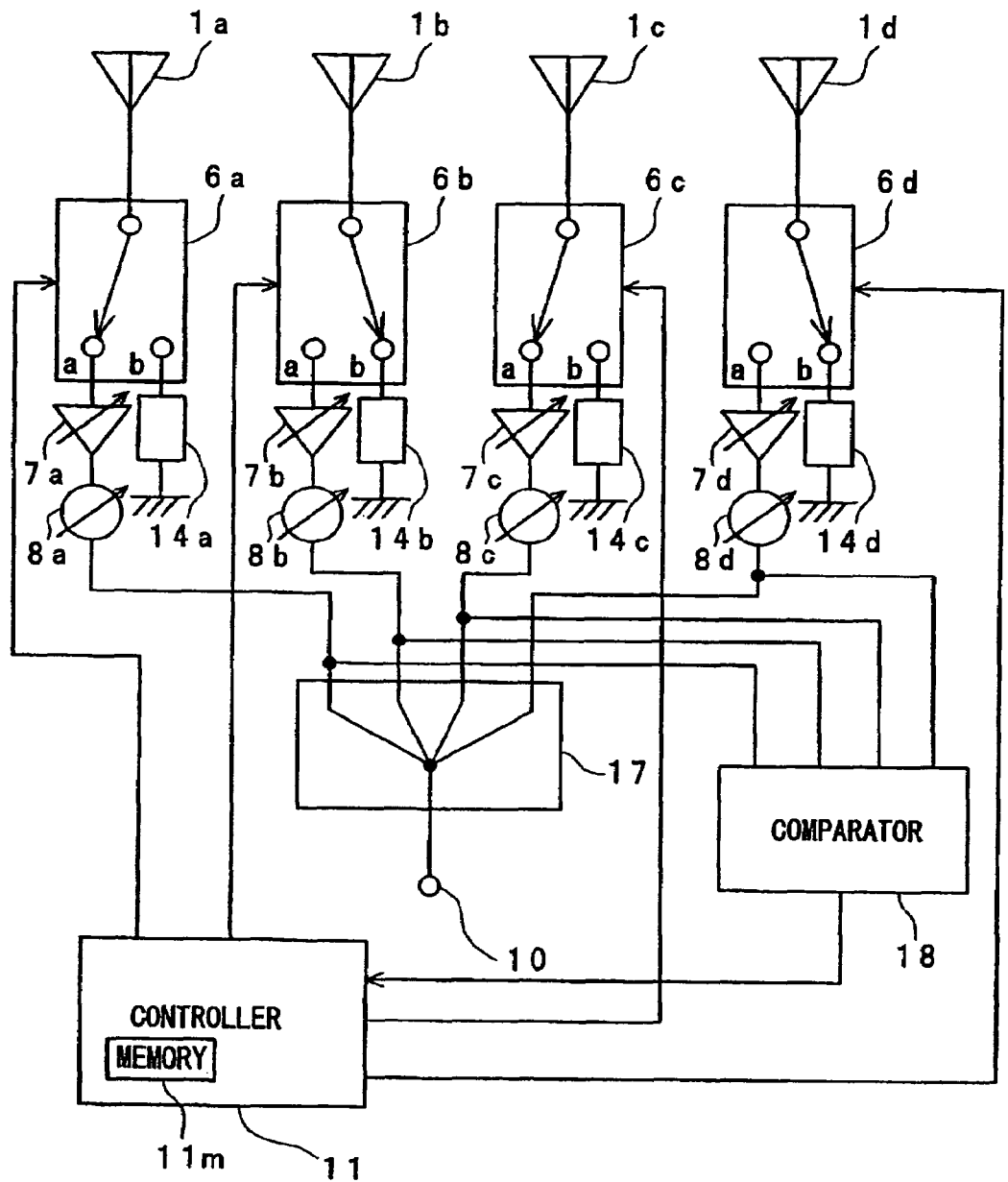
FIG. 27 is a block diagram showing an adaptive control circuit for an adaptive antenna apparatus according to an eighth preferred embodiment of the present invention.

FIG. 27 is a block diagram showing an adaptive control circuit for an adaptive antenna apparatus according to an eighth preferred embodiment of the present invention. The eighth preferred embodiment is characterized, as compared with the seventh preferred embodiment, by including a comparator 18 that compares signal electric powers of radio signals outputted from respective phase shifters 8a to 8d and that outputs antenna information indicating the highest signal electric power to a controller 11. By thus constituting the adaptive antenna apparatus, the comparator 18 can compare the received electric powers of a plurality of antennas simultaneously, and an adaptive control processing can be accelerated. The simultaneous comparison processing of the comparator 17 may be executed by the controller 11.

Ninth Preferred Embodiment

Figure 28:
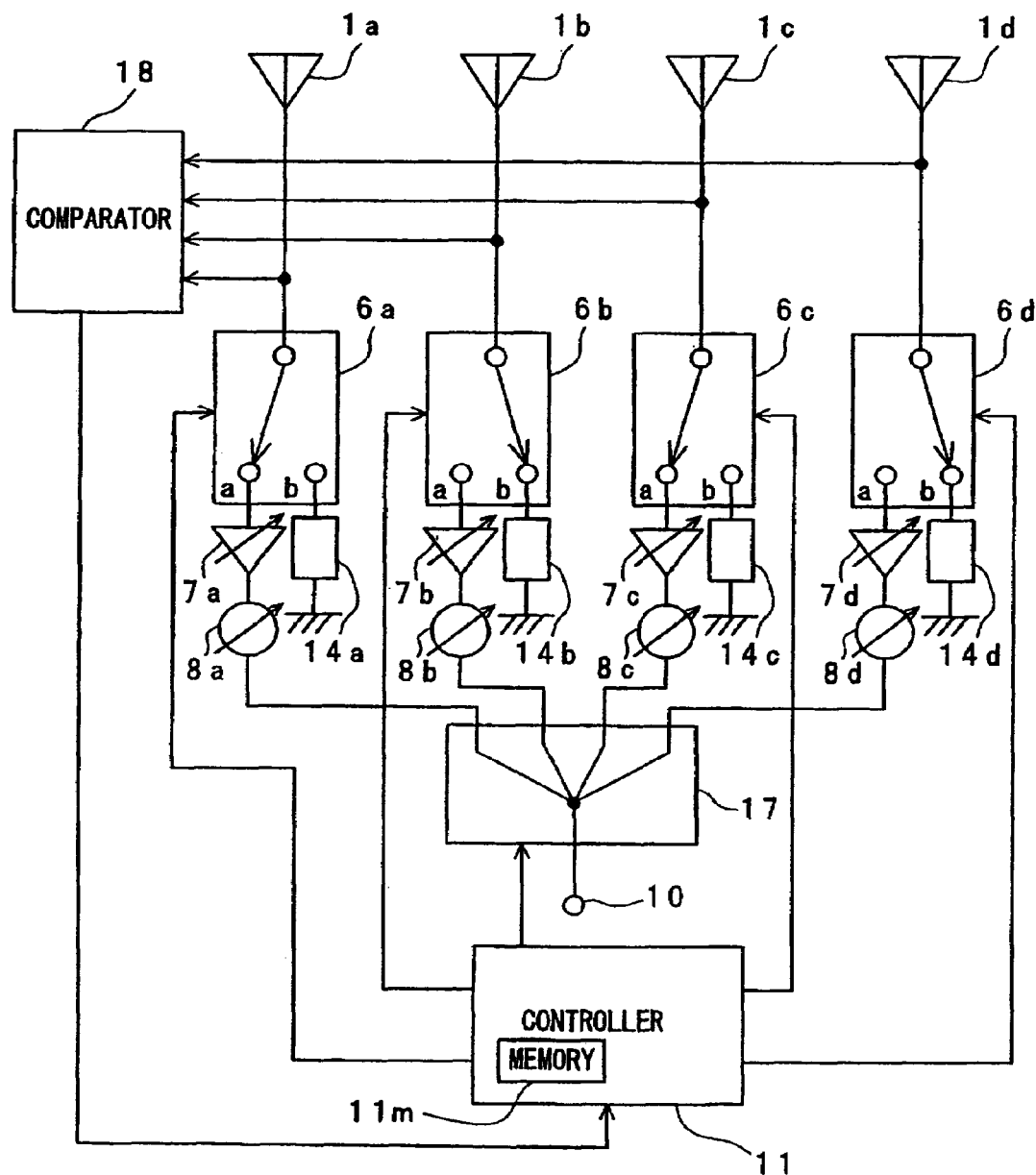
FIG. 28 is a block diagram showing an adaptive control circuit for an adaptive antenna apparatus according to a ninth preferred embodiment of the present invention.

FIG. 28 is a block diagram showing an adaptive control circuit for an adaptive antenna apparatus according to a ninth preferred embodiment of the present invention. In the eighth preferred embodiment, the comparator 18 compares the signal electric powers of the radio signals outputted from the respective phase shifters 8a to 8d. The ninth preferred embodiment is characterized in that a comparator 18 compares signal electric powers of radio signals outputted from respective antennas 1a to 1d, and outputs antenna information indicating the highest signal electric power to a controller 11.

In the above-stated seventh to ninth preferred embodiments, the load impedances 14a to 14d may have terminating resistances of 50 Ω, e.g., load impedances as serving as reactances.

Tenth Preferred Embodiment

Figure 29:
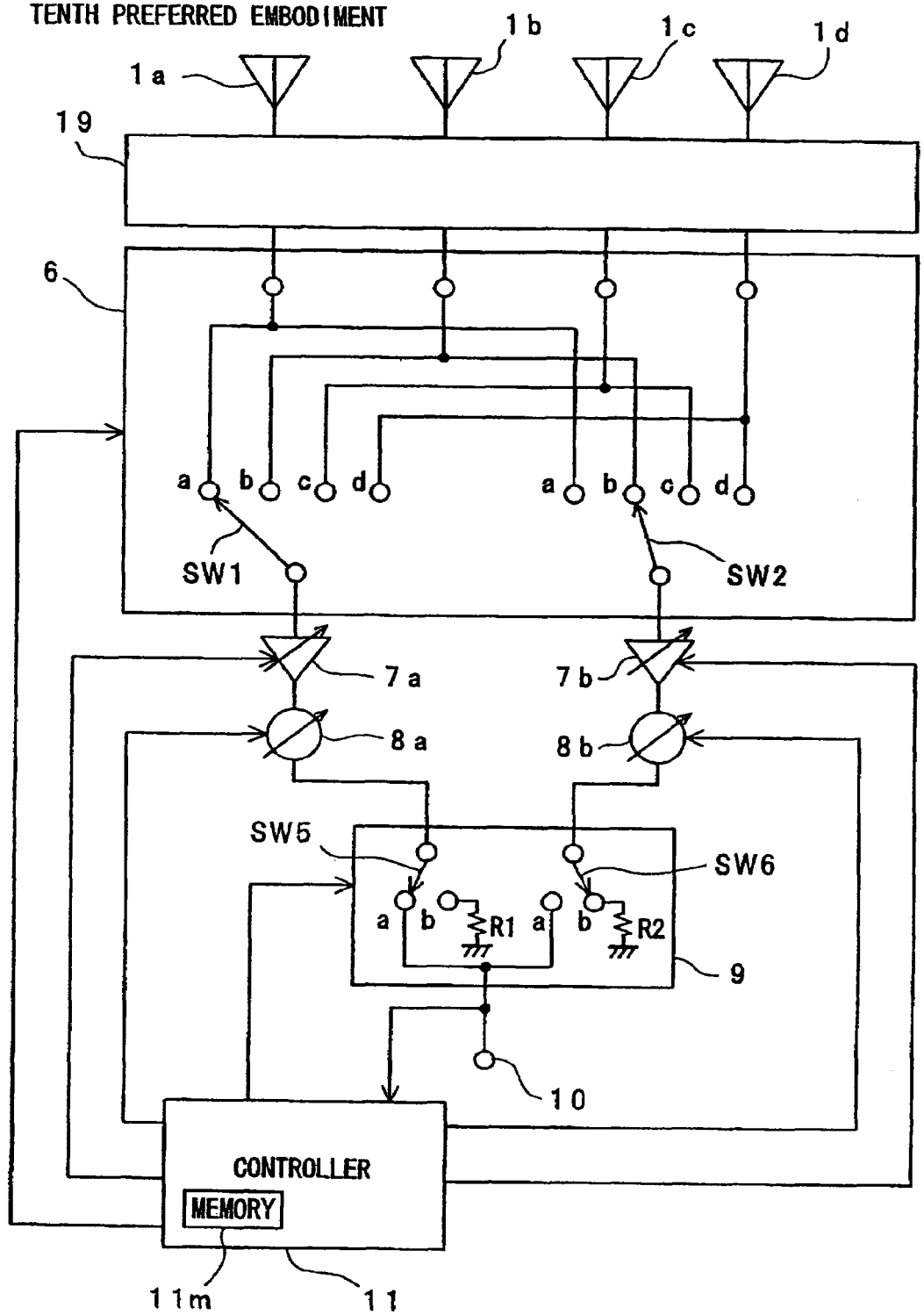
FIG. 29 is a block diagram showing an adaptive control circuit for an adaptive antenna apparatus according to a tenth preferred embodiment of the present invention.

FIG. 29 is a block diagram showing an adaptive control circuit for an adaptive antenna apparatus according to a tenth preferred embodiment of the present invention. In the first to the ninth preferred embodiments, the adaptive antenna apparatus takes the adaptive control over the radio signals. In the tenth preferred embodiment, as compared with the third preferred embodiment shown in FIG. 18, a radio signal processing circuit 19 may be inserted between antennas 1a to 1d and a switch circuit 6. The radio signal processing circuit 19 is characterized by executing a processing such as a high frequency amplification, a frequency conversion, or an intermediate frequency amplification to radio signals received by the respective antennas 1a and 1d, generating intermediate frequency signals corresponding to the radio signals received by the respective antennas 1a and 1d, and adaptively controlling the radio signals using the intermediate frequency signals.

Eleventh Preferred Embodiment

Figure 30:
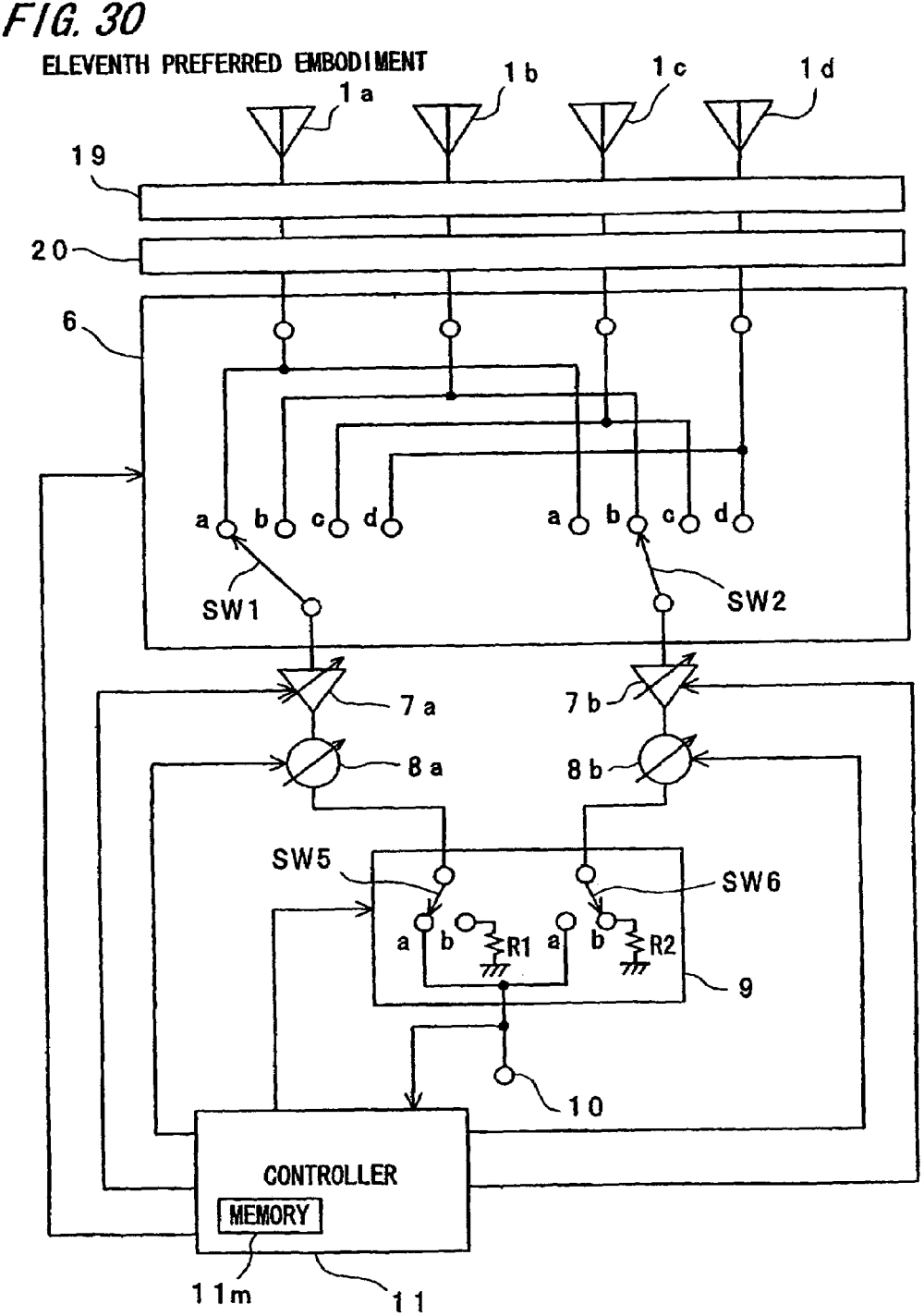
FIG. 30 is a block diagram showing an adaptive control circuit for an adaptive antenna apparatus according to an eleventh preferred embodiment of the present invention.

FIG. 30 is a block diagram showing an adaptive control circuit for an adaptive antenna apparatus according to an eleventh preferred embodiment of the present invention. In the tenth preferred embodiment, the intermediate frequency signals are adaptively controlled. In the eleventh preferred embodiment, as compared with the tenth preferred embodiment shown in FIG. 29, an intermediate frequency signal processing circuit 20 may be inserted between the radio signal processing circuit 19 and the switch circuit 9. The intermediate frequency signal processing circuit 20 is characterized by executing a processing such as a demodulation to intermediate frequency signals outputted from the radio signal processing circuit 19 and corresponding to antennas 1a to 1d, respectively, generating baseband signals corresponding to radio signals received by the respective antennas 1a to 1d, and adaptively controlling the radio signals using the baseband signals. By thus constituting the adaptive antenna apparatus, the frequencies of the signals to be processed can be lowered, in particular, the sampling frequencies of the signals used when a digital signal processing is performed can be lowered, and an inexpensive A/D converter required for digitizing signals can be employed.

Modified Preferred Embodiments

In the above-stated preferred embodiments, the respective antennas are equal in shape to each other. However, the present invention is not limited to this. The antennas having shapes different from each other and exhibiting the bidirectional characteristic may be employed.

As described above in detail, the adaptive antenna apparatus according to the present invention includes a total of four or more, even number N of antennas including a plurality of pairs of antennas each having a bidirectional characteristic and provided at vertexes of a polygon that includes as many vertexes as the antennas, respectively, and an adaptive control circuit that takes an adaptive control over radio signals using one pair of antennas opposing to each other. Accordingly, it is possible to effectively and surely adaptively control the radio signal with a simpler structure, to attain the main beam gain, and to obtain the high suppressed amount of the interference wave, as compared with those of prior art. In particular, it is possible to set the maximum phase shift amount required for the adaptive control to be up to 90 degrees or less, and the adaptive control circuit connected to the respective antennas can be configured by using one 90-degree phase shifter.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An adaptive antenna apparatus comprising:
a total of four or more, even number N of antennas including a plurality of pairs of antennas, each antenna having a bidirectional characteristic, said N antennas being provided respectively at vertexes of a polygon of the same number as the number N of said antennas, so that each pair of antennas of said plurality of pairs of antennas opposes to each other; and
an adaptive control circuit for taking an adaptive control over radio signals using one pair of antennas opposing to each other among said N antennas.

2. The adaptive antenna apparatus as claimed in claim 1, wherein said each pair of antennas is provided to oppose to each other so that axes of directions of main beams of the directional characteristics of said each pair of antennas substantially coincide with each other.

3. The adaptive antenna apparatus as claimed in claim 1, wherein the polygon is an equilateral polygon.

4. The adaptive antenna apparatus as claimed in claim 1, wherein said N antennas have the same shape as each other.

5. The adaptive antenna apparatus as claimed in claim 1, wherein an interval between said each pair of antennas is an interval obtained by adding an integer multiple of half the wavelength to a quarter of the wavelength.

6. The adaptive antenna apparatus as claimed in claim 1, wherein each of said N antennas is a half-wavelength dipole antenna.

* * * * *